(12) United States Patent
Kim et al.

(10) Patent No.: US 11,302,101 B2
(45) Date of Patent: Apr. 12, 2022

(54) ELECTRONIC APPARATUS FOR CONSTRUCTING A FINGERPRINT DATABASE, CONTROL METHOD THEREOF AND ELECTRONIC SYSTEM

(71) Applicant: SAMSUNG ELECTRONICS CO., LTD., Suwon-si (KR)

(72) Inventors: Younguk Kim, Suwon-si (KR); Minsoo Kim, Suwon-si (KR); Sungjin Kim, Suwon-si (KR); Hyunhan Kim, Suwon-si (KR); Jiwoong Choi, Suwon-si (KR); Hyunsoo Choi, Suwon-si (KR); Ilkoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 16/517,768

(22) Filed: Jul. 22, 2019

(65) Prior Publication Data
US 2020/0089963 A1 Mar. 19, 2020

(30) Foreign Application Priority Data
Sep. 18, 2018 (KR) .................. 10-2018-0111544

(51) Int. Cl.
*G06K 9/62* (2006.01)
*H04N 21/43* (2011.01)
(Continued)

(52) U.S. Cl.
CPC ........... *G06V 20/46* (2022.01); *G06K 9/6256* (2013.01); *H04N 21/23* (2013.01); *H04N 21/4307* (2013.01)

(58) Field of Classification Search
None
See application file for complete search history.

(56) References Cited

U.S. PATENT DOCUMENTS

| 4,677,466 A | 6/1987 | Lert, Jr et al. |
| 7,523,312 B2 | 4/2009 | Kalker et al. |

(Continued)

FOREIGN PATENT DOCUMENTS

| KR | 10-1315970 B1 | 10/2013 |
| KR | 10-2014-0067792 A | 6/2014 |

(Continued)

OTHER PUBLICATIONS

N. Srivastav, et al. "Hybrid object detection using improved three frame differencing and background subtraction," 2017 7th International Conference on Cloud Computing, Data Science & Engineering—Confluence, 2017, pp. 613-617, doi: 10.1109/CONFLUENCE.2017.7943225. (Year: 2017).*

(Continued)

*Primary Examiner* — Tahmina N Ansari
(74) *Attorney, Agent, or Firm* — Sughrue Mion, PLLC

(57) ABSTRACT

An electronic apparatus is provided. The electronic apparatus includes a communicator; and a processor configured to: receive multimedia data from an external apparatus through the communicator; identify a plurality of objects in a first frame among a plurality of frames included in the multimedia data; obtain content information corresponding to the plurality of objects in the first frame; obtain a first fingerprint based on the first frame; and control the communicator to transmit the content information and the first fingerprint to a server.

15 Claims, 19 Drawing Sheets

(51) Int. Cl.
*G06V 20/40* (2022.01)
*H04N 21/23* (2011.01)

(56) References Cited

U.S. PATENT DOCUMENTS

| | | | |
|---|---|---|---|
| 8,793,274 | B2 | 7/2014 | Yu et al. |
| 8,886,635 | B2 | 11/2014 | Cho et al. |
| 9,414,129 | B2 | 8/2016 | McRae |
| 2013/0318071 | A1 | 11/2013 | Cho et al. |
| 2014/0082646 | A1 | 3/2014 | Sandland |
| 2015/0199351 | A1 | 7/2015 | Borenstein et al. |
| 2016/0198200 | A1 | 7/2016 | Choi |
| 2017/0024470 | A1 | 1/2017 | Harron |
| 2017/0070789 | A1 | 3/2017 | Liassiddes et al. |
| 2017/0171609 | A1 | 6/2017 | Koh |
| 2018/0035162 | A1 | 2/2018 | Verrilli et al. |
| 2018/0176633 | A1 | 6/2018 | Yeo |
| 2018/0189841 | A1* | 7/2018 | Lee .................. G06Q 30/0255 |
| 2018/0205977 | A1 | 7/2018 | Choi |
| 2019/0050666 | A1 | 2/2019 | Kim et al. |

FOREIGN PATENT DOCUMENTS

| | | |
|---|---|---|
| KR | 10-2016-0085076 A | 7/2016 |
| KR | 10-1740271 B1 | 5/2017 |
| KR | 10-2017-0101076 A | 9/2017 |
| WO | 2014/004914 A1 | 1/2014 |

OTHER PUBLICATIONS

International Search Report (PCT/ISA/210) dated Nov. 19, 2019 issued by the International Searching Authority in International Application No. PCT/KR2019/010033.

Written Opinion (PCT/ISA/237) dated Nov. 19, 2019 issued by the International Searching Authority in International Application No. PCT/KR2019/010033.

Communication dated May 7, 2021, from the European Patent Office in European Application No. 19862515.4.

* cited by examiner

ELECTRONIC APPARATUS FOR CONSTRUCTING A FINGERPRINT DATABASE, CONTROL METHOD THEREOF AND ELECTRONIC SYSTEM

CROSS-REFERENCE TO RELATED APPLICATION

This application is based on and claims priority under 35 U.S.C. § 119 to Korean Patent Application No. 10-2018-0111544, filed on Sep. 18, 2018, in the Korean Intellectual Property Office, the disclosure of which is incorporated by reference herein in its entirety.

BACKGROUND

1. Field

The disclosure relates to an electronic apparatus, a control method thereof and an electronic system, and more particularly, an electronic apparatus constructing a fingerprint database, a control method thereof and an electronic system.

2. Description of Related Art

Automatic content recognition (ACR) may be used to recognize TV content. For ACR, it is necessary that program identification information and a title are constructed as a database. In particular, for content recognition based on a fingerprint, identification information (a fingerprint) of a content is extracted in advance, and the information is mapped with the title of the content and is stored in a server. Then, when identification information for the current screen is extracted at a television (TV) and is transmitted to the server, the server identifies whether there is matching identification information, and provides a program title and related information for the mapping identification information to the TV.

For database construction, a separate apparatus to collect program identification information, correlate the program identification information with program titles and transmit the information to a database server is necessary. It is difficult for these steps to be performed at one apparatus due to the large amount of required processing. Also, there is also a problem that it is difficult to reflect new content in the database in real time. In addition, there is also a problem that information can be provided only for content registered in a database.

Further, there is also a limitation for a TV to recognize a content by itself. In order for content to be recognized at a TV, it is necessary that information on the content be currently displayed. However, information on a content may only be displayed only in cases like change of a channel, turning-on of a TV, etc. That is, there is also a limitation for a TV to recognize a content independently.

Accordingly, a method for content recognition that can improve performance of content recognition and can also save cost became necessary.

SUMMARY

One or more embodiments may address the aforementioned needs, and may provide an electronic apparatus for minimizing a burden according to construction of a fingerprint database of a server and for constructing a real time fingerprint database, a control method thereof and an electronic system.

According to embodiments of the disclosure, there is provided an electronic apparatus including: a communicator; and a processor configured to: receive multimedia data from an external apparatus through the communicator; identify a plurality of objects in a first frame among a plurality of frames included in the multimedia data; obtain content information corresponding to the plurality of objects in the first frame; obtain a first fingerprint based on the first frame; and control the communicator to transmit the content information and the first fingerprint to a server.

The processor may be further configured to: based on the content information not being identified in a second frame after the first frame among the plurality of frames, obtain a second fingerprint based on the second frame; and control the communicator to transmit the second fingerprint to the server.

The processor may be further configured to: based on the content information being identified in a third frame after the second frame among the plurality of frames, obtain a third fingerprint based on the third frame; and control the communicator to transmit the content information and the third fingerprint to the server.

The processor may be further configured to control the communicator to transmit the content information, the first fingerprint and a first time point of reproduction of the first frame to the server.

The processor may be further configured to, based on identifying continuous frames among the plurality of frames as having pixel values within a threshold range in a first area of the continuous frames, obtain the content information by performing an optical character recognition process to the first area of the continuous frames.

The processor may be further configured to: obtain a plurality of fingerprints respectively corresponding to a second area of the continuous frames that is adjacent the first area; and control the communicator to transmit the plurality of fingerprints and the content information corresponding to the continuous frames to the server.

The electronic apparatus may include a storage. The processor may be further configured to identify the plurality of objects in the first frame based on a content information acquisition model stored in the storage. The content information acquisition model may be acquired by training based on a plurality of sample images and a plurality of pieces of content information included in the plurality of sample images through an artificial intelligence algorithm.

The electronic apparatus may include a display. The processor may be further configured to: control the display to sequentially display the plurality of frames; and sequentially obtain a corresponding fingerprint for a displayed frame among the plurality of frames.

The content information may include at least one from among a title of a content corresponding to the first frame, a reproduction time of the content or channel information of the content.

According to embodiments of the disclosure, there is provided an electronic system including: a server; and an electronic apparatus. The electronic apparatus is configured to: identify a plurality of objects in a first frame among a plurality of frames included multimedia data received from an external apparatus; obtain content information corresponding to the first frame among the plurality of objects; obtain a first fingerprint based on the first frame; and transmit the content information and the first fingerprint to the server. The server is configured to: receive the content information and the first fingerprint from the electronic apparatus; and map the first fingerprint with a content corresponding to the content information among a plurality of pre-stored contents and store the first fingerprint.

The electronic apparatus may be further configured to: based on the content information not being identified in a second frame after the first frame among the plurality of frames, obtain a second fingerprint corresponding to the second frame; and transmit the second fingerprint to the server. The server may be further configured to: receive the second fingerprint from the electronic apparatus; and map the second fingerprint with the content corresponding to the content information and store the second fingerprint.

The electronic system may further include another electronic apparatus. The server may be further configured to: based on receiving a third fingerprint from the another electronic apparatus, identify a third content corresponding to the third fingerprint; and transmit third content information corresponding to the third content to the another electronic apparatus.

The electronic system may further include another electronic apparatus configured to reproduce the content, and the server may be further configured to, based on fingerprints from the electronic apparatus not being received, transmit a request for fingerprints of frames for which fingerprints were not received to the another electronic apparatus.

The server may be further configured to, based on at least one from among the first fingerprint or the second fingerprint received from the electronic apparatus being pre-stored, transmit a request for stopping transmission of fingerprints for the content to the electronic apparatus, and the electronic apparatus may be further configured to, based on receiving the request for stopping transmission, stop obtaining the first fingerprint and the second fingerprint.

The server may be further configured to: identify an incomplete content for which fingerprints for all frames are not stored among the plurality of pre-stored contents; and transmit a request for fingerprints for the incomplete content to the electronic apparatus.

According to embodiments of the disclosure, there is provided a method of controlling an electronic apparatus including: receiving multimedia data from an external apparatus; identifying a plurality of objects in a first frame among a plurality of frames included in the multimedia data; obtaining content information corresponding to the plurality of objects in the first frame; obtaining a first fingerprint based on the first frame; and transmitting the content information and the first fingerprint to a server.

The method may further include: based on the content information not being identified in a second frame after the first frame among the plurality of frames, obtaining a second fingerprint based on the second frame; and transmitting the second fingerprint to the server.

The method may further include: based on the content information being identified in a third frame after the second frame among the plurality of frames, obtaining a third fingerprint based on the third frame; and transmitting the content information and the third fingerprint to the server.

The transmitting may include transmitting the content information, the first fingerprint and a first time point of reproduction of the first frame to the server.

The obtaining the content information may include based on identifying continuous frames among the plurality of frames as having pixel values within a threshold range in a first area of the continuous frames, obtaining the content information by performing an optical character recognition with respect to the first area of the continuous frames.

According to embodiments of the disclosure, there is provided a server including: a communicator; a storage having a database stored therein; and a processor configured to: receive first combined data from a first external device through the communicator, the first combined data including first content information and first fingerprint information corresponding to first multimedia content; identify whether the database includes a first entry corresponding to the first fingerprint information received from the first external device; update content information in the database that is associated with the first fingerprint information based on the database including the first entry; and add the first fingerprint information and the first content information to the database based on the database not including the first entry.

The database may include a second entry including second content information corresponding to second fingerprint information, and the processor may be further configured to: receive the second fingerprint information from a second external device through the communicator, wherein the second content information is not received with the second fingerprint information from the second external device; identify the second entry in the database based on the second fingerprint information received from the second external device; and control the communicator to transmit the second content information to the second external device.

The second content information may be received through the communicator from a third external device.

DETAILED DESCRIPTION

Figure 1:
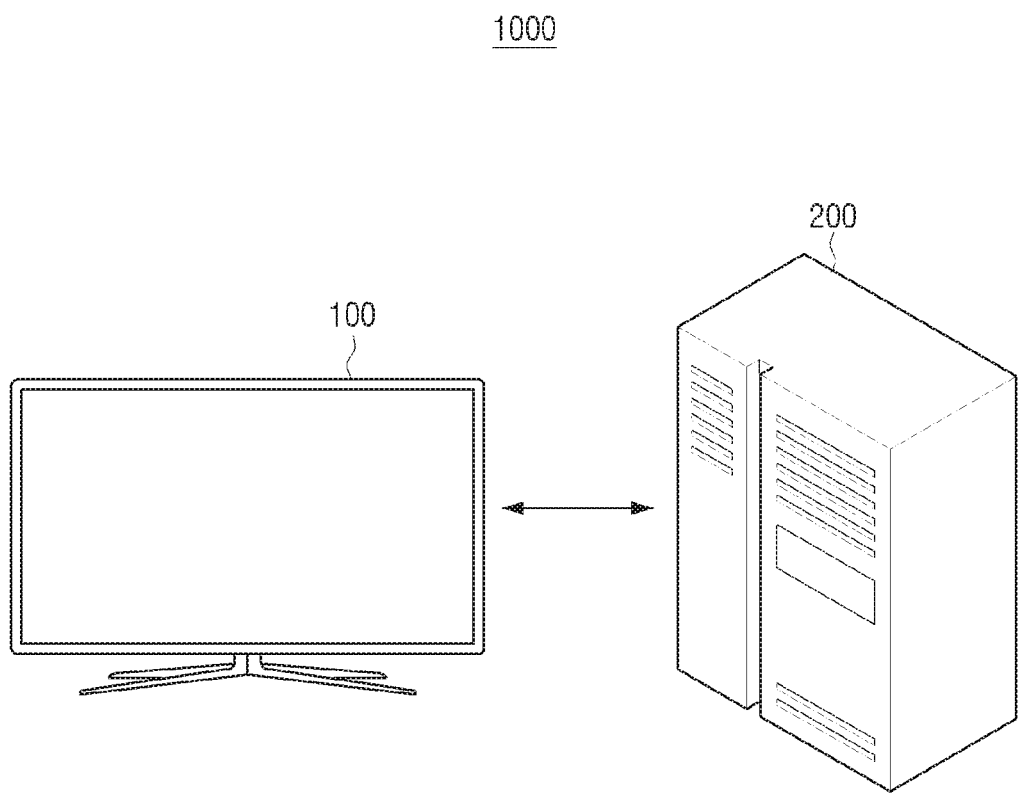
FIG. 1 is a diagram illustrating an electronic system according to an embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, various embodiments will be described in detail with reference to the accompanying drawings.

FIG. 1 is a diagram illustrating an electronic system 1000 according to an embodiment. As illustrated in FIG. 1, the electronic system 1000 includes an electronic apparatus 100 and a server 200.

The electronic apparatus 100 may communicate with an external apparatus. For example, the electronic apparatus 100 may include a display such as a TV, a desktop personal computer (PC), a laptop computer, a smartphone, a tablet PC, smart glasses, a smart watch, etc., and reproduce multimedia data received from an external apparatus like a set-top box (STB). In FIG. 1, it is illustrated that the electronic apparatus 100 is a display apparatus, but the disclosure is not limited thereto. For example, the electronic apparatus 100 may be an apparatus not including a display, such as a speaker, a main body of a computer, etc. In this case, the electronic apparatus 100 may transmit multimedia data received from an external apparatus to an apparatus including a display. That is, any apparatus may be the electronic apparatus 100 if it is an apparatus receiving multimedia data from an external apparatus. Here, an external apparatus may not only be a set-top box, but also an external content server, a broadcasting station server, a satellite cable server, etc. Also, an external apparatus may be a universal serial bus (USB) device, a compact disc (CD) reader, a game machine, a set-top, etc., or any apparatus that can provide multimedia data to the electronic apparatus 100. Multimedia data may include at least one of video data or audio data.

The electronic apparatus 100 may identify a frame as either a first type frame or a second type frame. The first type frame may include graphic data overlaid on a frame of video data like an on-screen display (OSD) and content information may be indicated by the graphic data. A second type frame may not have graphic data overlaid on the frame and may not indicate content information. The electronic apparatus 100 may identify a plurality of objects in a first frame among a plurality of frames included in multimedia data. For example, the electronic apparatus 100 may identify graphic data overlaid on a frame of video data like an OSD in a first frame. Alternatively, the electronic apparatus 100 may identify a title, a person, a product, a logo, etc. in a first frame through object recognition. Or, the electronic apparatus 100 may identify music, lines, etc. included in multimedia data.

In addition, the electronic apparatus 100 may acquire content information corresponding to the first frame (for example, the content information may relate to the plurality of objects in the first frame), acquire a fingerprint based on the first frame, and transmit the content information and the fingerprint to a server 200.

Here, a fingerprint is identification information that may distinguish a frame from another frame, and means intrinsic data of each frame. Specifically, a fingerprint is feature data extracted from at least one of a video signal, an image signal or an audio signal included in a frame, and reflects an intrinsic feature of a signal itself, unlike metadata based on texts. Accordingly, a fingerprint may also be called as fingerprint data, DNA data or genetic data. For example, in the case of an image signal or a video signal, a fingerprint may be data expressing features such as a motion vector, a color, etc.

A fingerprint may be extracted using an algorithm. As an example, an audio signal is divided into specific time intervals, and the sizes of signals of frequencies included in each time interval are calculated. Then, frequency tilts are calculated by calculating differences in sizes between signals in adjacent frequency sections, and in case a tilt is a positive number, it is quantized as 1, and in case a tilt is a negative number, it is quantized as 0, and fingerprint data may thereby be generated. However, the disclosure is not limited thereto, and a fingerprint may be acquired by numerous various methods.

The server 200 may communicate with the electronic apparatus 100. The server 200 may receive content information and a fingerprint from the electronic apparatus 100, map the fingerprint with a content corresponding to the received content information among a plurality of pre-stored contents, and store the fingerprint.

Also, the server 200 may receive a fingerprint for each frame of a content from the electronic apparatus 100, and construct a fingerprint database for the entire content.

When a fingerprint is received from another electronic apparatus, the server 200 may identify a content corresponding to the received fingerprint from the fingerprint database, and provide information corresponding to the identified content to the another electronic apparatus.

So far, operations of an electronic apparatus 100 and a server 200 included in an electronic system 1000 were described briefly. Hereinafter, a method of constructing a fingerprint database will be described in detail focusing on the operations of the electronic apparatus 100.

Figure 2A:
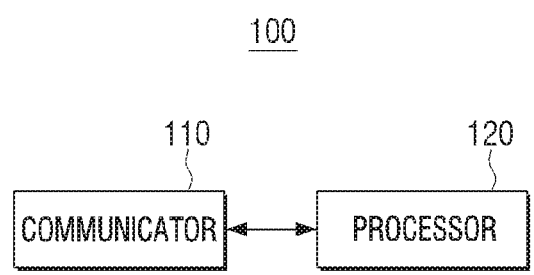
FIG. 2A is a block diagram illustrating an example of a configuration of an electronic apparatus.

FIG. 2A is a block diagram illustrating an example of a configuration of the electronic apparatus 100.

According to FIG. 2A, the electronic apparatus 100 includes a communicator 110 and a processor 120. The communicator 110 may be a transceiver (transmitter and receiver).

The communicator 110 may be used to communicate with the server 200. For example, the communicator 110 may support various communication methods such as Bluetooth (BT), Bluetooth Low Energy (BLE), Wireless Fidelity (Wi-Fi), Zigbee, etc. However, the disclosure is not limited thereto, and any communication standard among various communication standards may be used if it is capable of performing wireless communication with the server 200.

Alternatively, the communicator 110 may include a communication interface that is capable of performing wired communication with an external apparatus. For example, the communicator 110 may include a communication interface such as an High-Definition Multimedia Interface (HDMI), an Mobile High-Definition Link (MHL), a USB, an RGB, a D-subminiature (D-SUB), a Digital Visual Interface (DVI), etc.

Also, the electronic apparatus 100 may be connected to an external apparatus and receive multimedia data. In this case, the electronic apparatus 100 may be connected to an external apparatus through a communication interface such as an HDMI, a DP, a thunderbolt, a USB, an RGB, a D-SUB, a DVI, etc., and the communicator 110 may include all wired communication interfaces. A wired communication interface may perform video input and audio input through one port or more than one port. For example, the wired communication interface may perform video input and audio input through two ports.

However, the disclosure is not limited thereto, and any wired communication interface may be used if it is in a standard that is cable of performing at least one of video input or audio input.

In addition to the wired communication interfaces described so far, the communicator 110 may include interfaces in all communication standards that are capable of performing wired communication with an external apparatus or the server 200.

The processor 120 controls the overall operations of the electronic apparatus 100.

According to an embodiment, the processor 120 may be implemented as a digital signal processor (DSP), a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP), a communication processor (CP), or an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 may receive multimedia data from an external apparatus through the communicator 110, identify a plurality of objects in a first frame among a plurality of frames included in the multimedia data, acquire content information corresponding to the first frame among the plurality of objects, and acquire a first fingerprint based on the first frame. Also, the processor 120 may control the communicator 110 to transmit the content information and the first fingerprint to the server 200.

Then, the processor 120 may, in case the content information is not identified in a frame after the first frame among the plurality of frames, acquire a second fingerprint based on a second frame wherein the content information was not identified, and control the communicator 110 to transmit the second fingerprint to the server 200.

For example, the electronic apparatus 100 may include a display, and receive multimedia data from an external apparatus like a set-top box. A set-top box may be turned on or its channel may be changed according to a user instruction, and the set-top box may transmit the content of the current channel as multimedia data. Also, the set-top box may generate multimedia data such that OSD information, like information on the current channel, information on the content provided on the channel, etc., is displayed while being overlaid on some frames of the content according to a turn-on operation or a channel changing operation. In addition, the processor 120 may receive multimedia data and display the data, and identify texts included in graphic data, like OSD information and actors, logos, etc., included in an image in a first frame among a plurality of frames.

Further, the processor 120 may acquire content information indicating a content corresponding to the first frame, among the recognized pieces of information. For example, the processor 120 may acquire information excluding numbers, images, etc. among the identified pieces of information as content information. Alternatively, the processor 120 may acquire information identified from graphic data as content information. Or, the processor 120 may acquire content information by putting together information identified from graphic data and actors, etc. included in an image.

Then, the processor 120 may acquire a first fingerprint based on a first frame, and control the communicator 110 to transmit the content information and the first fingerprint to the server 200.

Also, the processor 120 may, in case the content information is not identified in a frame after the first frame among the plurality of frames, acquire a second fingerprint based on a second frame wherein the content information was not identified, and control the communicator 110 to transmit the second fingerprint to the server 200. In this case, if only the second fingerprint is received from the same electronic apparatus 100 without the content information, the server 200 may map the second fingerprint by using the content information that was previously received together with the first fingerprint, and store the second fingerprint.

In addition, the processor 120 may, in case the content information is re-identified in a third frame after the second frame among the plurality of frames, acquire a third fingerprint based on the third frame wherein the content information was re-identified, and control the communicator 110 to transmit the re-identified content information and the third fingerprint to the server 200.

However, the disclosure is not limited thereto, and the processor 120 may, in case the content information is not identified in a frame after the first frame, acquire a second fingerprint based on a second frame wherein the content information was not identified, and control the communicator 110 to transmit the second fingerprint and the content information of the first frame before the second frame to the server 200. The processor 120 may perform the same operation for a frame after the second frame. Here, in case the content information is not identified in a frame, the processor 120 may transmit the content information of the first type frame which is the closest among the frames before the current frame to the server 200 together with the fingerprint of the current frame.

Alternatively, the processor 120 may acquire second fingerprints in a plurality of second type frames in a predetermined number after the first frame of the first frame type, and control the communicator 110 to transmit the first fingerprint, the plurality of second fingerprints and the content information to the server 200. That is, the processor 120 may identify the first frame of the first frame type and a plurality of second type frames after the first frame as one frame group, and transmit the fingerprints of each of the plurality of frames included in the frame group and the content information acquired in the first frame to the server 200, and thereby reduce the transmission amount of data.

Further, the processor 120 may control the communicator 110 to transmit the content information, the first fingerprint and a time point of reproduction of the first frame to the server 200. That is, the processor 120 may control the communicator 110 to transmit to the server 200 information assisting such that it can be identified which frame of which content the fingerprint currently being transmitted belongs to. Also, the processor 120 may acquire a time point of reproduction from OSD information, etc.

The processor 120 may perform the same operation for the second fingerprint. For example, the processor 120 may control the communicator 110 to transmit the second fingerprint and a time point of reproduction of the second frame to the server 200.

However, the disclosure is not limited thereto, and the processor 120 may control the communicator 110 to transmit the content information, the first fingerprint and the frame information of the first frame to the server 200. Also, the processor 120 may control the communicator 110 to transmit the second fingerprint and the frame information of the second frame to the server 200.

Here, the frame information of the first frame may be information indicating the relative position of the first frame among the entire frames of a content corresponding to the first frame. For example, the frame information of the first frame may be information indicating that the frame is the tenth frame among 1000 frames in total of a content corresponding to the first frame.

The processor 120 may, in case images having pixel values in a predetermined similar range are identified in the same areas of some continuous frames among the plurality of frames, acquire the content information by applying an optical character reader (OCR) to the images. Here, an image may be an image including information corresponding to video data. Also, an image may be overlaid on an area of a frame such that it has transparency, or it may be overlaid in a manner of covering an area of a frame.

For example, the processor may 120, in case the same images are identified in the lower portions of some continuous frames among the plurality of frames, acquire the content information by applying an OCR to the identified images. Alternatively, the processor 120 may, in case similar images are identified in the lower portions of some continuous frames among the plurality of frames, acquire the content information by applying an OCR to the identified images. Here, images in a similar range may be images wherein the sum of the differences in corresponding pixel values in the same areas of the first frame and the second frame is equal to or less than a predetermined value.

However, the disclosure is not limited thereto, and the processor 120 may identify images in a predetermined similar range by numerous various methods. For example, the processor 120 may identify images in a predetermined similar range in the same areas of some continuous frames among a plurality of frames through an artificial intelligence model trained through an artificial intelligence algorithm.

Alternatively, the processor 120 may recognize texts by applying an OCR to each frame, and in case the texts are the same, the processor 120 may acquire the texts as the content information. In this case, the processor 120 may identify moving texts.

The content information may include at least one of a title of a content corresponding to the first frame among at least one content corresponding to the multimedia data, a reproduction time of the content or channel information of the content. For example, the content information may include one of a title of a content corresponding to the first frame among at least one content corresponding to the multimedia data, a reproduction time of the content or channel information of the content. Alternatively, the content information may include some of a title of a content corresponding to the first frame among at least one content corresponding to the multimedia data, a reproduction time of the content or channel information of the content. Or, the content information may include all of a title of a content corresponding to the first frame among at least one content corresponding to the multimedia data, a reproduction time of the content or channel information of the content. Other than the above, the content information may further include the appearing characters, products, logos, music, lines, a time point of reproduction, etc. of a content corresponding to the first frame.

Alternatively, the processor 120 may, in case images having pixel values in a predetermined similar range are identified in the same areas of some continuous frames among the plurality of frames, identify a plurality of objects by applying an OCR to the images, and acquire the content information of a content corresponding to the first frame from the plurality of objects.

For example, the processor 120 may identify a title of a content corresponding to the first frame, a time point of reproduction of the content, channel information of the content, and the appearing characters, products, logos, music, lines, a time point of reproduction, etc. of the content, and acquire the title of the content among them as content information. Then, the processor 120 may control the communicator 110 to transmit only the content information among the identified information to the server 200.

The processor 120 may acquire a fingerprint of each of the plurality of frames based on the remaining areas excluding the area wherein the image was identified in each of the plurality of frames. That is, in consideration of the problem that a fingerprint is distorted by an image covered on the original frame of a content, the processor 120 may acquire fingerprints only in the remaining areas excluding the image.

Alternatively, the electronic apparatus 100 may further include a storage, and the processor 120 may identify a plurality of objects in a first frame based on a content information acquisition model stored in the storage, and acquire content information corresponding to the first frame among the plurality of objects. Here, the content information acquisition model may be acquired by training with a plurality of sample images and a plurality of pieces of content information included in the plurality of sample images through an artificial intelligence algorithm.

The electronic apparatus 100 may further include a display, and the processor 120 may control the display to sequentially display the plurality of frames, and acquire a fingerprint in a displayed frame among the plurality of frames.

For example, the processor 120 may not acquire a fingerprint as multimedia data is received, but may acquire a fingerprint after multimedia data is received and displayed. That is, the processor 120 may acquire a fingerprint only when a user views a content corresponding to multimedia data. Accordingly, the processor 120 may transmit only a fingerprint corresponding to a content that a user views to the server 200, and the server 200 may acquire a content viewing history of the user of the electronic apparatus 100.

However, the disclosure is not limited thereto, and the processor 120 may perform an operation of acquiring a fingerprint in case there is a recording command for multimedia data.

Figure 2B:
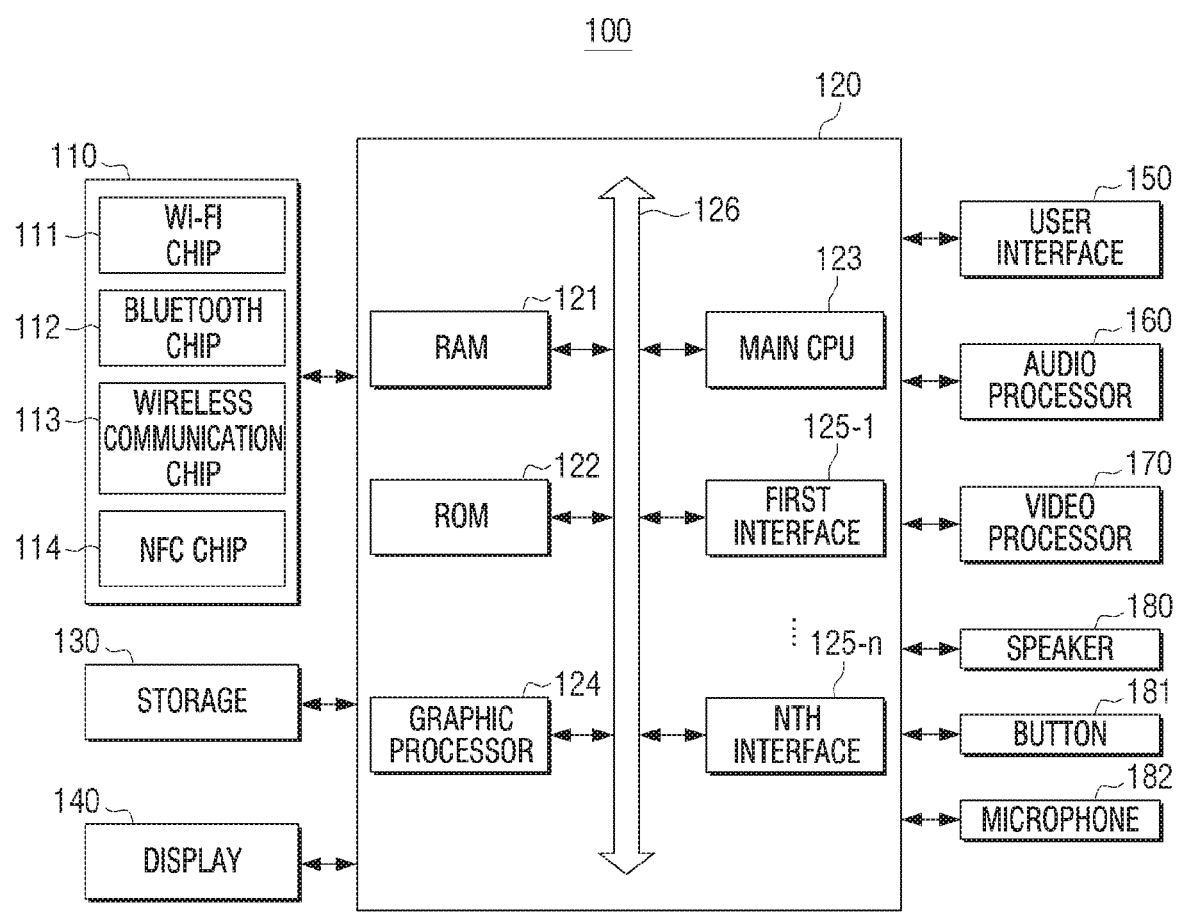
FIG. 2B is a block diagram illustrating an example of a detailed configuration of an electronic apparatus.

FIG. 2B is a block diagram illustrating an example of a detailed configuration of the electronic apparatus 100. The electronic apparatus 100 may include a communicator 110 and a processor 120. Also, according to FIG. 2B, the electronic apparatus 100 may further include a storage 130, a display 140, a user interface 150, an audio processor 160, a video processor 170, a speaker 180, a button 181 and a microphone 182. Among the components illustrated in FIG. 2B, with respect to the components overlapping with the components illustrated in FIG. 2A, detailed explanation will be omitted.

The processor 120 controls the overall operations of the electronic apparatus 100 by using various programs stored in the storage 130.

Specifically, the processor 120 includes a random access memory (RAM) 121, a read only memory (ROM) 122, a main CPU 123, a graphic processor 124, first to nth interfaces 125-1-125-n and a bus 126.

The RAM 121, ROM 122, main CPU 123, graphic processor 124, first to nth interfaces 125-1-125-n, etc. may be connected with one another through the bus 126.

The first to nth interfaces 125-1-25-n are connected with the aforementioned various types of components. One of the interfaces may be a network interface that is connected with an external apparatus through a network.

The main CPU 123 accesses the storage 130, and performs booting by using an operating system (O/S) stored in the storage 130. Then, the main CPU 123 performs various operations by using various programs, etc. stored in the storage 130.

The ROM 122 stores a set of instructions, etc. for system booting. When a turn-on instruction is input and power is supplied, the main CPU 123 copies the O/S stored in the storage 130 in the RAM 121 according to the instruction stored in the ROM 122, and boots the system by executing the O/S. When booting is completed, the main CPU 123 copies one or more instructions corresponding to the various types of application programs stored in the storage 130 in the RAM 121, and performs various types of operations by executing the programs copied in the RAM 121.

The graphic processor 124 generates a screen including various objects such as icons, images, texts, etc. by using an operation part and a rendering part. The operation part calculates attribute values such as coordinate values, shapes, sizes, colors, etc. by which each object will be displayed according to the layout of the screen based on a received control command. The rendering part generates screens in various layouts including objects, based on the attribute values operated at the operation part. The screens generated at the rending part are displayed in the display area of the display 140.

The aforementioned operations of the processor 120 may be performed by programs stored in the storage 130.

The storage 130 stores various types of data such as O/S software module for operating the electronic apparatus 100, a fingerprint acquisition module, an OCR module, etc.

The communicator 110 is a feature that communicates with various types of external apparatuses according to various types of communication methods. The communicator 110 may include a Wi-Fi chip 111, a Bluetooth chip 112, a wireless communication chip 113, a near field communication (NFC) chip 114, etc.

The Wi-Fi chip 111 and the Bluetooth chip 112 communicate by a Wi-Fi method and a Bluetooth method, respectively. In the case of using the Wi-Fi chip 111 or the Bluetooth chip 112, various types of connection information such as an service set identifier (SSID) or a session key is transmitted and received first, and connection of communication is performed by using the information, and various types of information can be transmitted and received thereafter. The wireless communication chip 113 refers to a chip configured to communicate according to various communication standards such as IEEE, Zigbee, 3rd Generation (3G), 3rd Generation Partnership Project (3GPP), Long Term Evolution (LTE), etc. The NFC chip 114 refers to a chip that operates in an NFC method using a 13.56 MHz band among various radio-frequency identification (RF-ID) frequency bands such as 135 kHz, 13.56 MHz, 433 MHz, 860~960 MHz, 2.45 GHz, etc.

Also, the communicator 110 may further include a wired communication interface such as an HDMI, an MHL, a USB, a DP, a thunderbolt, an RGB, a D-SUB, a DVI, etc. The processor 120 may be connected to an external apparatus through a wired communication interface. In this case, the processor 120 may receive video data from an external apparatus through a wired communication interface.

The display 140 may be implemented as displays in various forms such as a liquid crystal display (LCD), an organic light emitting diodes (OLED) display, a plasma display panel (PDP), etc. In the display 140, driving circuits that may be implemented in forms such as an s-Si thin-film-transistor (TFT), a low temperature poly silicon (LTPS) TFT and an organic TFT (OTFT), a backlight unit, etc. may also be included together. The display 140 may also be combined with a touch detector and implemented as a touch screen.

The user interface 150 receives various types of user interactions. Here, the user interface 150 may be implemented in various forms according to the implementation examples of the electronic apparatus 100. For example, the user interface 150 may be a button provided on the electronic apparatus 100, a microphone receiving a user voice, a camera detecting a user motion, etc. Alternatively, in case the electronic apparatus 100 is implemented as a terminal apparatus based on touches, the user interface 150 may be implemented in the form of a touch screen that constitutes an inter-layer structure with a touch pad. In this case, the user interface 150 may be used as the aforementioned display 140.

The audio processor 160 is a component performing processing of audio data. At the audio processor 160, various kinds of processing such as decoding or amplification, noise filtering, etc. of audio data may be performed.

The video processor 170 is a component performing processing of video data. At the video processor 170, various kinds of image processing such as decoding, scaling, noise filtering, frame rate conversion, resolution conversion, etc. of video data may be performed.

The speaker 180 is a component outputting various types of notification sound or voice messages, as well as various types of audio data processed at the audio processor 160.

The button 181 may be various types of buttons such as a mechanical button, a touch pad, a wheel, etc. formed in any areas like the front surface part or the side surface part, the rear surface part, etc. of the exterior of the main body of the electronic apparatus 100.

The microphone 182 is a component for receiving input of a user voice or other kinds of sound, and converting it to audio data.

Through the method as described above, the processor 120 may transmit the fingerprint and the text of the frame included in video data to the server 200.

Figure 3:
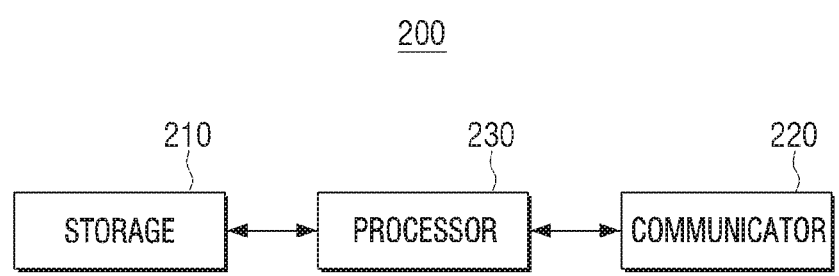
FIG. 3 is a block diagram illustrating an example of a configuration of a server.

FIG. 3 is a block diagram illustrating an example of a configuration of the server 200.

According to FIG. 3, the server 200 includes a storage 210, a communicator 220 and a processor 230.

The storage 210 may be provided separately from the processor 230, and implemented as a hard disk, a non-volatile memory, a volatile memory, etc.

The storage 210 may store a plurality of contents. For example, the storage 210 may store a content corresponding to multimedia data that an external apparatus provides to the electronic apparatus 100. Also, the storage 210 may store electronic program guide (EPG) information provided from an external content server, a broadcasting station server, etc.

In addition, the storage 210 may map a fingerprint received from the electronic apparatus 100 with the frame of a corresponding content, and store the fingerprint.

The communicator 220 is a component for that may be used to communicate with the electronic apparatus 100. For example, the communicator 220 may support various communication methods such as BT, BLE, Wi-Fi, Zigbee, etc. However, the disclosure is not limited thereto, and any communication standard among various communication standards may be used if it is capable of performing wireless communication with the electronic apparatus 100. Other than the above, the communicator 220 may include a communication interface that is capable of performing wired communication with the electronic apparatus 100. For example, the communicator 220 may include a communication interface such as an HDMI, an MHL, a USB, an RGB, a D-SUB, a DVI, etc.

Other than the wired communication interfaces described above, the communicator 220 may include interfaces in all communication standards that are capable of performing wired and wireless communication with an external apparatus or the electronic apparatus 100.

The processor 230 controls the overall operations of the server 200.

According to an embodiment, the processor 230 may be implemented as a DSP, a microprocessor, and a TCON. However, the disclosure is not limited thereto, and the processor 230 may include one or more of a CPU, an MCU, an MPU, a controller, an AP, a CP, or an ARM processor, or may be defined by the terms. Also, the processor 230 may be implemented as an SoC having a processing algorithm stored therein or large scale integration (LSI), or in the form of a field programmable gate array (FPGA).

The processor 230 may receive content information and a first fingerprint from the electronic apparatus 100 through the communicator 220. Also, the processor 230 may receive a second fingerprint from the electronic apparatus 100 through the communicator 220. Here, the first fingerprint may be the fingerprint of the first frame wherein the content information was acquired, and the second fingerprint may be the fingerprint of the second frame wherein the content information was not identified.

Also, the processor 230 may map the first fingerprint with a content corresponding to the content information among a plurality of contents stored in advance in the storage 210, and store the first fingerprint. For example, if the content information received from the electronic apparatus 100 is "friends," the processor 230 may map the first fingerprint with a content corresponding to "friends" among the plurality of pre-stored contents, and store the first fingerprint.

Here, the processor 230 may additionally receive at least one of a time point of reproduction or frame information of the first frame from the electronic apparatus 100. Then, the processor 230 may map the first fingerprint with a frame corresponding to at least one of the time point of reproduction or the frame information among the plurality of frames included in the content corresponding to "friends," and store the first fingerprint.

When the second fingerprint is received, the processor 230 may identify that the second fingerprint was received from the electronic apparatus 100, and map the second fingerprint with a content corresponding to the content information received from the electronic apparatus 100, and store the second fingerprint. The mapping operation for the frame of the content is the same as the method of mapping the first fingerprint.

The electronic system 1000 may further include another electronic apparatus. Another electronic apparatus may be an apparatus that is not capable of acquiring content information, unlike the electronic apparatus 100. Or, another electronic apparatus may be an apparatus that is not capable of identifying an object in multimedia data, unlike the electronic apparatus 100. For example, another electronic apparatus may be an apparatus that is capable of acquiring only a fingerprint for each of a plurality of frames included in multimedia data, and is not capable of text recognition.

When a third fingerprint is received from another electronic apparatus, the processor 230 may identify a content corresponding to the third fingerprint among the plurality of contents, and transmit information corresponding to the identified content to the another electronic apparatus. Here, the server 200 may have stored all the fingerprints of the content corresponding to the third fingerprint. Alternatively, the server 200 may have stored the third fingerprint in a minimum range.

The electronic system 1000 may further include another electronic apparatus reproducing a content. Here, another electronic apparatus may be an apparatus that is capable of acquiring fingerprints and content information as the electronic apparatus 100.

Then, if fingerprints are not additionally received from the electronic apparatus 100 before fingerprints corresponding to all frames of a content are received, the processor 230 may receive fingerprints of the remaining frames for which fingerprints were not received from another electronic apparatus.

For example, the processor 230 may receive fingerprints for some frames among the plurality of frames included in the content corresponding to "friends" from the electronic apparatus 100. Then, if fingerprints for the remaining frames among the plurality of frames included in the content corresponding to "friends" are not received from the electronic apparatus 100, the processor 230 may receive fingerprints for the remaining frames from another electronic apparatus reproducing the content corresponding to "friends."

There may be various methods for receiving fingerprints from a plurality of electronic apparatuses. For example, in case a first electronic apparatus and a second electronic apparatus reproduce the same content, respectively, each of the first electronic apparatus and the second electronic apparatus may acquire fingerprints and content information, and transmit them to the server 200. Then, the processor 230 may construct a fingerprint database based on the fingerprints and the content information received from any one of the first electronic apparatus and the second electronic apparatus. Here, the processor 230 may ignore the fingerprints and the content information received from the other one of the first electronic apparatus and the second electronic apparatus. Afterwards, if fingerprints and content information are not received from one of the first electronic apparatus and the second electronic apparatus, the processor 230 may construct a fingerprint database based on the fingerprints and the content information received from the other one of the first electronic apparatus and the second electronic apparatus.

Alternatively, the processor 230 may construct a fingerprint database based on the fingerprints and the content information received from any one of the first electronic apparatus and the second electronic apparatus. Then, the processor 230 may transmit a request for stopping transmission of fingerprints and content information to the other one of the first electronic apparatus and the second electronic apparatus. Afterwards, if fingerprints and content information are not received from one of the first electronic apparatus and the second electronic apparatus, the processor 230 may transmit a request for resuming transmission of fingerprints and content information to the other one of the first electronic apparatus and the second electronic apparatus. Then, the processor 230 may construct a fingerprint database based on the fingerprints and the content information received from the other one of the first electronic apparatus and the second electronic apparatus. Here, the other one of the first electronic apparatus and the second electronic apparatus may stop the operation of acquiring fingerprints and content information according to a request for stopping transmission, and may acquire fingerprints and content information again according to a request for resuming transmission.

The processor 230 may, in case at least one of the first fingerprint or the second fingerprint received from the electronic apparatus 100 has been stored in advance, transmit a request for stopping transmission of fingerprints for a content to the electronic apparatus 100. Then, when the request for stopping transmission is received, the electronic apparatus 100 may stop acquisition of the first fingerprint and the second fingerprint. Also, the electronic apparatus 100 may stop the operation of acquiring content information.

The processor 230 may identify a content for which fingerprints for all frames are not stored among the plurality of contents, and transmit a request for the fingerprints for the content to the electronic apparatus 100. For example, the processor 230 may periodically identify a content for which fingerprints for all frames are not stored among the plurality of contents, and transmit a request for the fingerprints for the identified content to the electronic apparatus 100.

Here, the electronic apparatus 100 may acquire fingerprints for the plurality of frames included in the content according to the request by the server 200, even though the content is not reproduced.

So far, operations of the electronic apparatus 100 and the server 200 included in the electronic system 1000 have been described briefly. Hereinafter, operations of the electronic apparatus 100 and the server 200 will be described in more detail with reference to the drawings.

FIGS. 4A, 4B, 4C and 4D are diagrams for illustrating a method for the electronic apparatus 100 to acquire fingerprints and content information according to various embodiments.

Figure 4A:
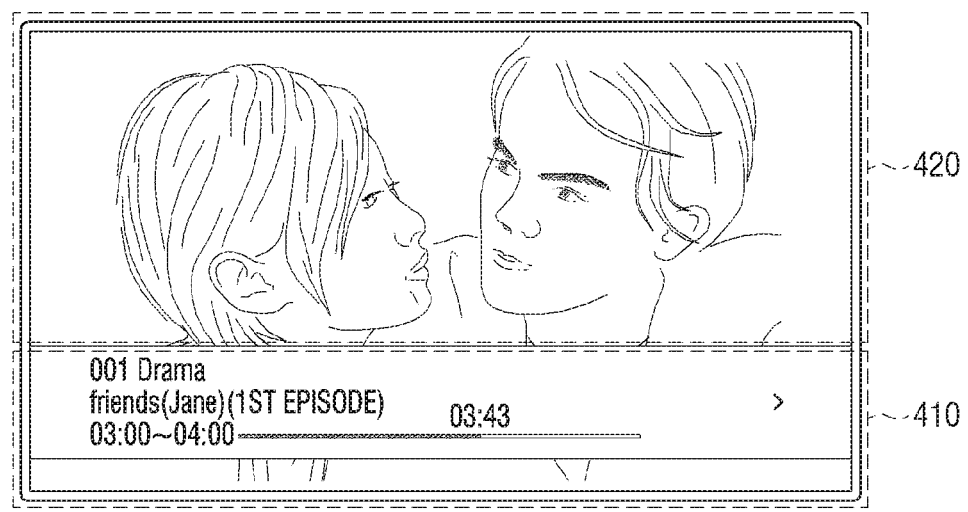
FIG. 4A is a diagram for illustrating a method for an electronic apparatus to acquire fingerprints and content information according to various embodiments.

First, FIG. 4A illustrates a first frame including content information among a plurality of frames included in multimedia data. The processor 120 may identify a first frame including content information among a plurality of frames included in multimedia data.

The processor 120 may acquire content information included in graphic data 410. For example, the processor 120 may acquire content information by applying an OCR to the graphic data 410.

The content information may include at least one of a title of a content corresponding to the first frame among at least one content corresponding to the multimedia data, a reproduction time of the content, a time point of reproduction of the content or channel information of the content. For example, as illustrated in FIG. 4A, the content information may include at least one of a title of a content (friends) corresponding to the frame, a time period of reproduction of the content (03:00-04:00), a time point of reproduction of the content (03:43) or channel information of the content (001 Drama). Also, the content information may further include information on the appearing character (Jane) of the content, the episode of the content (the first episode), etc.

When the graphic data 410 is identified in the lower part of the frame, the processor 120 may check only the lower parts of the subsequent frames. For example, the processor 120 may identify whether graphic data is included in the lower parts of the subsequent frames. In case graphic data is included in the upper parts of the subsequent frames, the processor 120 may not identify the graphic data.

However, the disclosure is not limited thereto, and the processor 120 may identify whether graphic data is included in all areas of the subsequent frames.

The processor 120 may acquire a first fingerprint based on a first frame. In particular, the processor 120 may acquire a first fingerprint of a frame based on the remaining areas 420 excluding an area wherein the graphic data 410 was identified. Through such an operation, the problem that the first fingerprint of the first frame is distorted by the graphic data 410 can be overcome.

Also, the processor 120 may control the communicator 110 to transmit the content information and the first fingerprint to the server 200. In particular, the processor 120 may control the communicator 110 to transmit the content information, the first fingerprint and a time point of reproduction of the first frame to the server 200. Alternatively, the processor 120 may control the communicator 110 to transmit the content information, the first fingerprint and frame information of the first frame to the server 200.

Figure 4B:
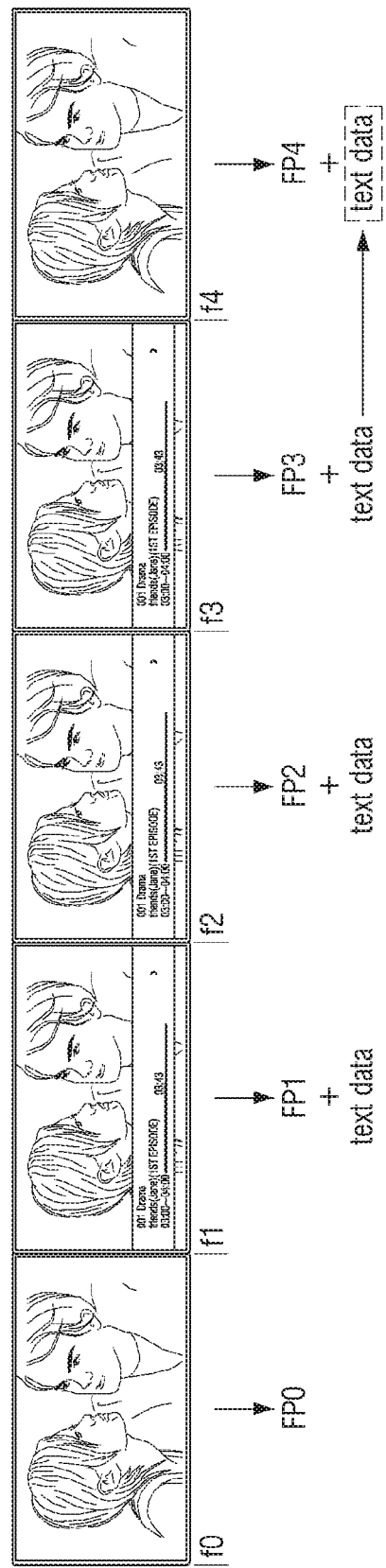
FIG. 4B is a diagram for illustrating a method for an electronic apparatus to acquire fingerprints and content information according to various embodiments.

The processor 120 may, in case images having pixel values in a predetermined similar range are identified in the same areas of some continuous frames among the plurality of frames, acquire content information by applying an OCR to the images. For example, as illustrated in FIG. 4B, in case the same images are identified in the same lower parts in some continuous frames of the frame 1(*f*1) to the frame 3(*f*3), the processor 120 may acquire content information by applying an OCR to the images.

In particular, the processor 120 may transmit identified objects to the server 200 only when all objects identified in the same images are identical to one another. For example, in case objects identified in the lower part of the frame 1(*f*1) and objects identified in the lower parts of the frame 2(*f*2) and the frame 3(*f*3) are different from one another, the processor 120 may not transmit the identified objects to the server 200. That is, the processor 120 may acquire only objects that are identical to one another among a plurality of objects as content information, and transmit the acquired content information to the server 200.

Also, the processor 120 may determine whether to transmit identified objects based on the number of continuous frames. For example, as illustrated in FIG. 4B, the processor 120 may transmit identified objects to the server 200 only when objects identified in at least three continuous frames are identical to one another.

In case the same objects are identified in specific areas of frames in continuous frames in a predetermined number, the processor 120 may identify objects in areas corresponding to the specific areas in the subsequent frames. That is, the processor 120 may not perform an operation of acquiring content in areas corresponding to the remaining areas excluding the specific areas in the subsequent frames.

Alternatively, the processor 120 may identify objects, such as actors, logos, etc., in the entire area of a frame. In particular, in the case of a frame wherein texts are not identified, such as the frames f0 and f4, the processor 120 may identify objects from an image, and acquire content information corresponding to the identified objects. For example, in case the processor 120 identifies the first actor and the second actor as objects in the entire area of a frame, the processor 120 may identify a content wherein the first actor and the second actor appeared at the same time, and transmit the title, etc. of the identified content to the server 200.

Also, the processor 120 may acquire a fingerprint of each of a plurality of frames based on the remaining areas excluding the areas wherein images were identified in each of the plurality of frames.

The processor 120 may identify the frames f0 and f4 as the second type frames in which graphic data was not identified among a plurality of frames included in multimedia data. Then, the processor 120 may acquire a second fingerprint based on the areas of the second type frames corresponding to the remaining areas excluding the identified area in the first frame.

In addition, the processor 120 may control the communicator 110 to transmit the second fingerprint to the server 200.

However, the disclosure is not limited thereto, and the processor 120 may control the communicator 110 to transmit the second fingerprint and the content information recognized in the first frame before the second frame to the server 200.

For example, the processor 120 may control the communicator 110 to transmit the second fingerprint of the frame 4(*f*4) and the content information acquired in the frame 3(*f*3) before the frame 4(*f*4) to the server 200. A first frame does not exist before the frame 0(*f*0), and thus the processor 120 may not transmit the second fingerprint of the frame 0(*f*0) to the server 200.

The processor 120 may acquire second fingerprints in a plurality of second frames in a predetermined number after a first frame, and control the communicator 110 to transmit the first fingerprint, the plurality of second fingerprints and the content information to the server 200.

Figure 4C:
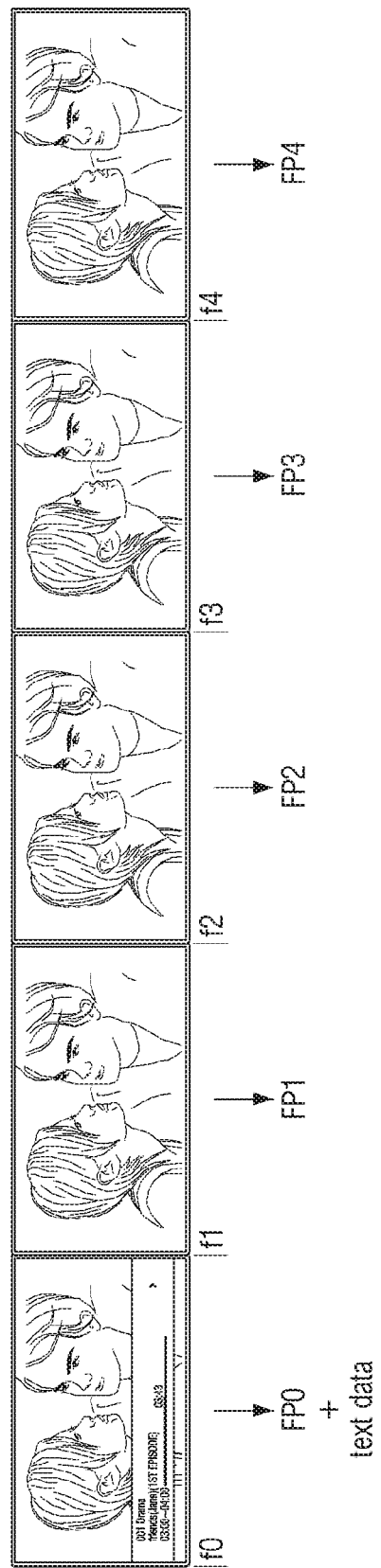
FIG. 4C is a diagram for illustrating a method for an electronic apparatus to acquire fingerprints and content information according to various embodiments

For example, as illustrated in FIG. 4C, the processor 120 may acquire content information and a first fingerprint in the frame 0(*f*0). Then, the processor 120 may acquire a second fingerprint of each of the frame 1(*f*1) to the frame 4(*f*4). Further, the processor 120 may transmit the first fingerprint, the four second fingerprints and the content information to the server 200.

In FIGS. 4A, 4B and 4C, it was described that the electronic apparatus 100 further includes a display 140, and the processor 120 acquires a fingerprint in a displayed frame among a plurality of frames. However, the disclosure is not limited thereto.

For example, when multimedia data is input from an external apparatus, the processor 120 may acquire fingerprints in a plurality of frames included in the multimedia data even though the plurality of frames are not displayed. As an example, when a command for transmitting fingerprints for a specific content is received from the server 200, the processor 120 may request the specific content to an external content server, a broadcasting station server, etc. Then, when multimedia data for the specific content is received, the processor 120 may acquire a fingerprint for each of a plurality of frames included in the multimedia data, and transmit the acquired fingerprints to the server 200. Here, the processor 120 may not perform an operation of acquiring content information in the specific content.

Figure 4D:
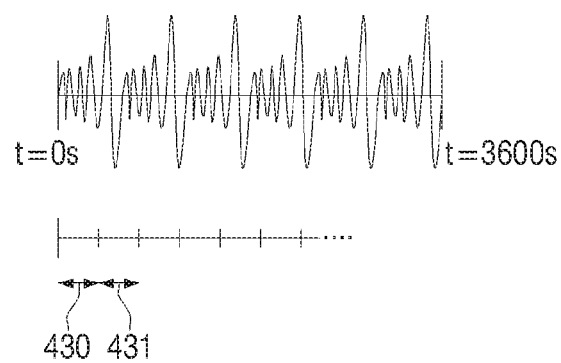
FIG. 4D is a diagram for illustrating a method for an electronic apparatus to acquire fingerprints and content information according to various embodiments.

In FIGS. 4A, 4B and 4C, it was described that the processor 120 acquires fingerprints in video data included in multimedia data. However, the disclosure is not limited thereto. For example, the processor 120 may acquire fingerprints from audio data included in multimedia data, as illustrated in FIG. 4D. Here, the processor 120 does not acquire fingerprints of a specific time point as a frame, but may acquire fingerprints in predetermined time units (430, 431, . . . ). Here, information on the predetermined time units (430, 431, . . . ) may be shared with the server 200. That is, the server 200 may construct a fingerprint database of a content by the same time units.

Figure 5A:
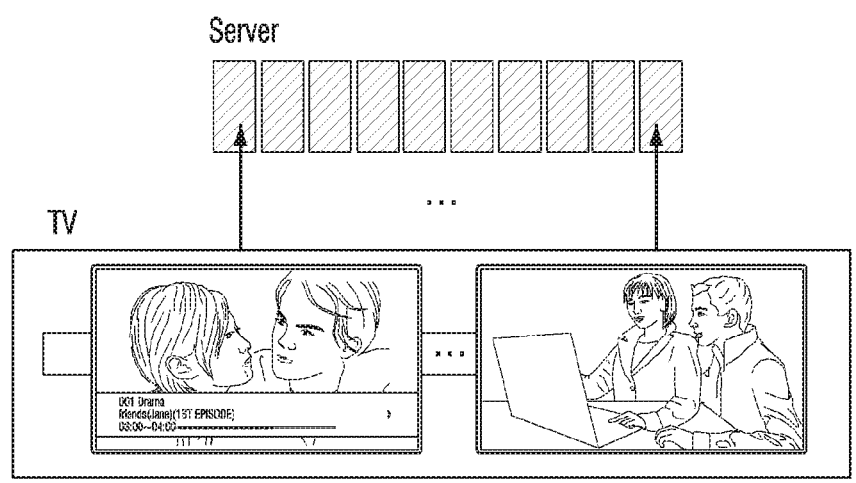
FIG. 5A is a diagram for illustrating a method of constructing a database of a server according to an embodiment.
Figure 5B:
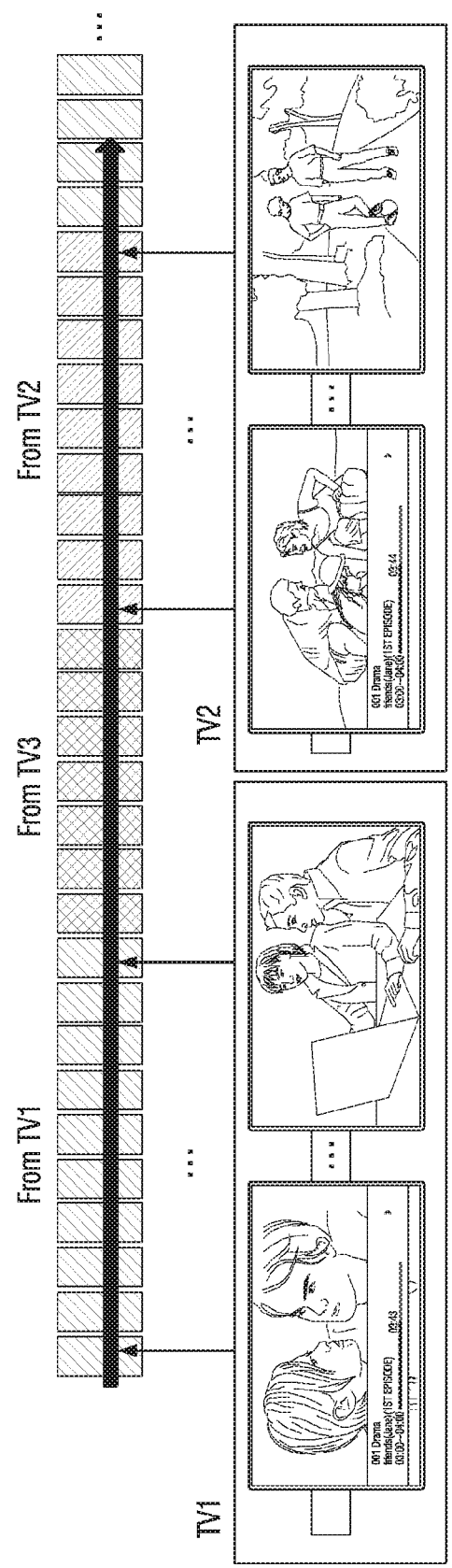
FIG. 5B is a diagram for illustrating a method of constructing a database of a server according to an embodiment.
Figure 5C:
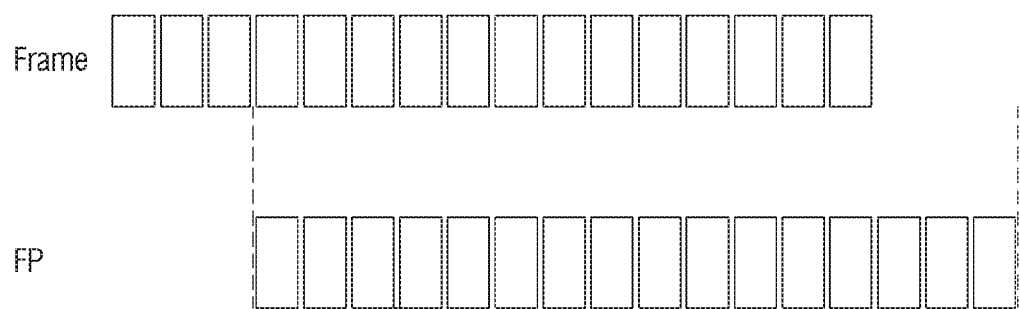
FIG. 5C is a diagram for illustrating a method of constructing a database of a server according to an embodiment.

FIGS. 5A, 5B and 5C are diagrams for illustrating a method of constructing a database of a server 200 according to an embodiment.

The processor 230 of the server 200 may receive content information and a fingerprint from the electronic apparatus 100. Then, the processor 230 may map the fingerprint to a content corresponding to the content information among a plurality of contents, and store the fingerprint. Here, the processor 230 may map the frame and the fingerprint of the content based on a time point of reproduction received from the electronic apparatus 100, and store the frame and the fingerprint. Alternatively, the processor 230 may map the frame and the fingerprint of the content based on the frame information received from the electronic apparatus 100, and store the frame and the fingerprint.

For example, the electronic apparatus 100 may transmit information that a frame is the 53rd frame, along with the fingerprint and the content information of the 53rd frame to the server 200. Then, the processor 230 may identify a content corresponding to the content information among a plurality of contents, and map the fingerprint with the 53rd frame of the identified content, and store the fingerprint.

So far, it was described that the electronic apparatus 100 transmits the content information and the time point of reproduction of each frame as well as the acquired fingerprints to the server 200. However, the disclosure is not limited thereto. For example, the electronic apparatus 100 may acquire content information in a first frame wherein graphic data was identified, acquire a first fingerprint, and transmit the content information, the first fingerprint and a time point of reproduction to the server 200, and transmit only fingerprints for the subsequent frames. Then, the processor 230 of the server 200 may identify a content corresponding to the content information among a plurality of contents, and map the first fingerprint with a specific frame of the identified content based on the time point of reproduction, and store the first fingerprint. Afterwards, the processor 230 may sequentially map the fingerprints received from the electronic apparatus 100 with frames after the specific frame, and store the fingerprints.

The processor 230 may receive fingerprints from a plurality of electronic apparatuses, and construct a fingerprint database. For example, as illustrated in FIG. 5B, the processor 230 may receive fingerprints for different frames of a content from a first electronic apparatus, a second electronic apparatus and a third electronic apparatus, and construct a fingerprint database.

Alternatively, the processor 230 may transmit requests for fingerprints to the first electronic apparatus and the third electronic apparatus, such that some of the fingerprints received from the first electronic apparatus and the third electronic apparatus correspond to the same frame. Also, the processor 230 may transmit requests for fingerprints to the first electronic apparatus and the third electronic apparatus, such that some of the fingerprints received from the third electronic apparatus and the second electronic apparatus correspond to the same frame.

For example, the processor 230 may request fingerprints for the frame 1 to the frame 10 from the first electronic apparatus, request fingerprints for the frame 8 to the frame 20 from the third electronic apparatus, and request fingerprints for the frame 18 to the frame 30 from the second electronic apparatus. Here, the processor 230 may synchronize the frames and the fingerprints by using the fingerprints of the overlapping frames.

FIG. 5C is a diagram for illustrating synchronization by delay according to an embodiment.

As illustrated in FIG. 5C, a frame and a fingerprint of a content may be asynchronously mapped. For example, a time point of reproduction may include a time of delay in case the current time of the electronic apparatus 100 is incorrect, or due to delay until receiving multimedia data from an external apparatus, etc. In this case, as illustrated in FIG. 5C, the processor 230 may map a fingerprint with a frame after a corresponding frame.

Accordingly, when all fingerprints of a content corresponding to the content information are received, the processor 230 may identify whether mapping was performed correctly. For example, the processor 230 may identify that the last three fingerprints were not mapped, and in case the initial three frames are not mapped, correct mapping of the entire fingerprints to frames before the three frames.

Alternatively, when all fingerprints of a content corresponding to the content information are received, the processor 230 may acquire fingerprints based on at least one frame of the content, and compare the acquired fingerprints with the received fingerprints, and synchronize the frames and the fingerprints.

Figure 6:
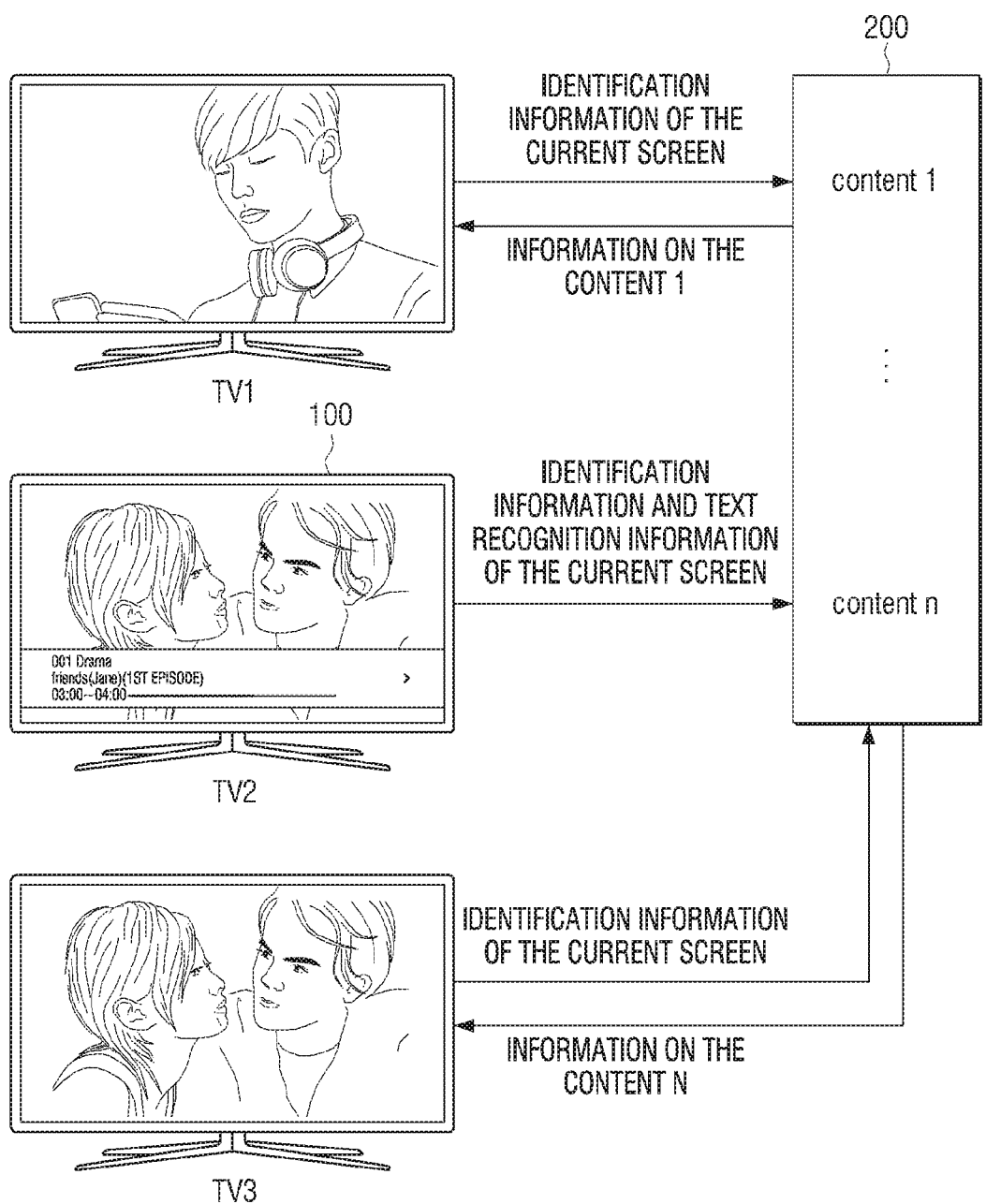
FIG. 6 is a diagram for illustrating a method for a server to provide content information according to an embodiment.

FIG. 6 is a diagram for illustrating a method for a server 200 to provide content information according to an embodiment.

Here, the server 200 has a plurality of contents and fingerprints corresponding to the plurality of contents stored therein.

The processor 230 may receive identification information of the current screen from the first TV. Here, the identification information of the current screen may be the fingerprints of the current screen.

The processor 230 may identify the content 1 including a frame corresponding to the received identification information among the plurality of contents, and transmit information on the content 1 to the first TV.

Alternatively, the processor 230 may receive identification information and text recognition information of the current screen from the second TV. Here, the text recognition information may be text recognized on the current screen.

Then, the processor 230 may identify the content n corresponding to the text recognition information among the plurality of contents, and map the frames and identification information of the content n, and store the frames and the identification information. The processor 230 may map identification information for each frame included in the content n in the same manner, and store the frames and the identification information.

Here, the processor 230 may receive identification information of the current screen from the third TV. Then, the processor 230 may identify the content n including a frame corresponding to the received identification information from among the plurality of contents, and transmit information on the content n to the third TV.

That is, the processor 230 may construct a fingerprint database based on the fingerprints received from the second TV, and provide content information to the third TV based on the fingerprint database.

The third TV may transmit the content information to an advertisement server, and receive an advertisement corresponding to the content information from the advertisement server, and display the advertisement. That is, through a method as described above, an advertisement reflecting a user's viewing history can be provided.

Figure 7:
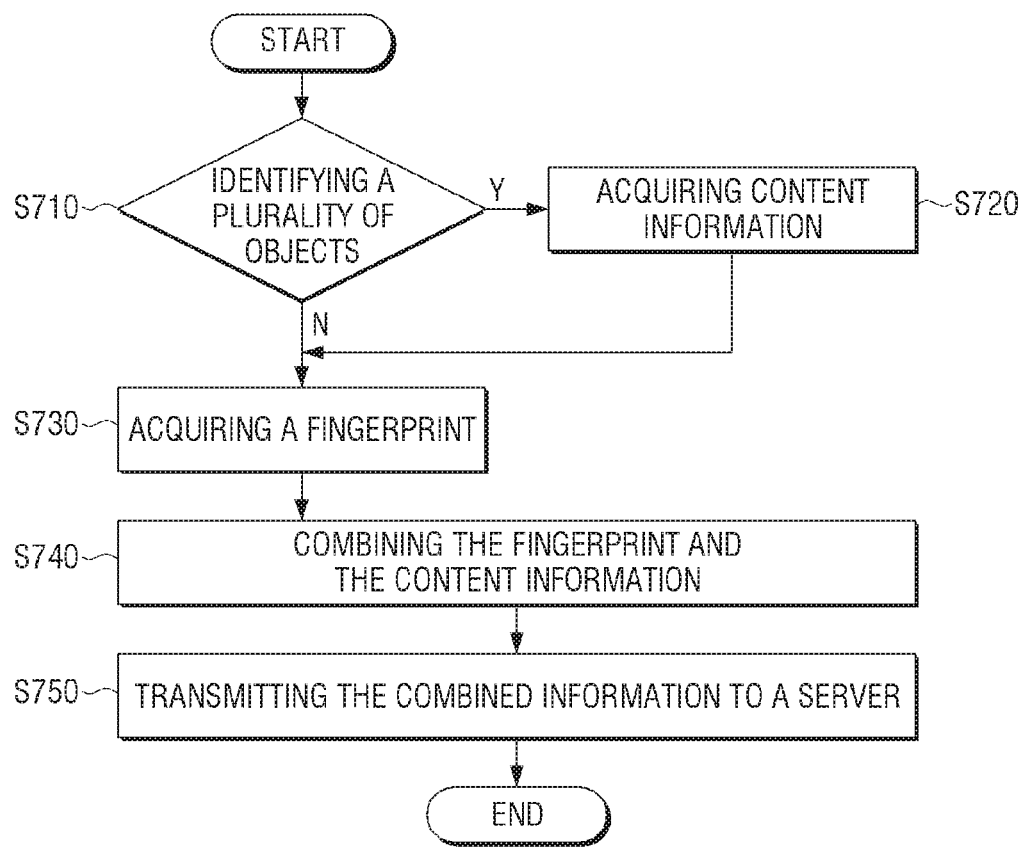
FIG. 7 is a flow chart for illustrating an operation of an electronic apparatus according to an embodiment.

FIG. 7 is a flow chart for illustrating an operation of an electronic apparatus 100 according to an embodiment.

First, the processor 120 of the electronic apparatus 100 may identify a plurality of objects in the current frame. For example, if graphic data is identified in the current frame, the processor 120 may identify a plurality of objects from the graphic data. As an example, the processor 120 may identify objects such as a title of a content, a time point of reproduction of the content and channel information of the content in an area of OSD information included in the current frame. Also, the processor 120 may identify objects such as the appearing characters in the current frame, and billboards, product names, etc. included in the frame.

If a plurality of objects are identified in the current frame at operation S710-Y, the processor 120 may acquire content information corresponding to the plurality of objects at operation S720. Here, the content information is information to be transmitted to the server 200, and it may be information for identifying the current frame. For example, the processor 120 may acquire content information like a title of a content among the plurality of objects.

Then, the processor 120 may acquire fingerprints based on the current frame at operation S730. In case a plurality of objects are not identified at operation S710-N, the processor 120 may extract fingerprints instantly at operation S730.

The processor 120 may combine the fingerprints and the content information at operation S740, and transmit the combined information to the server 200 at operation S750.

Figure 8:
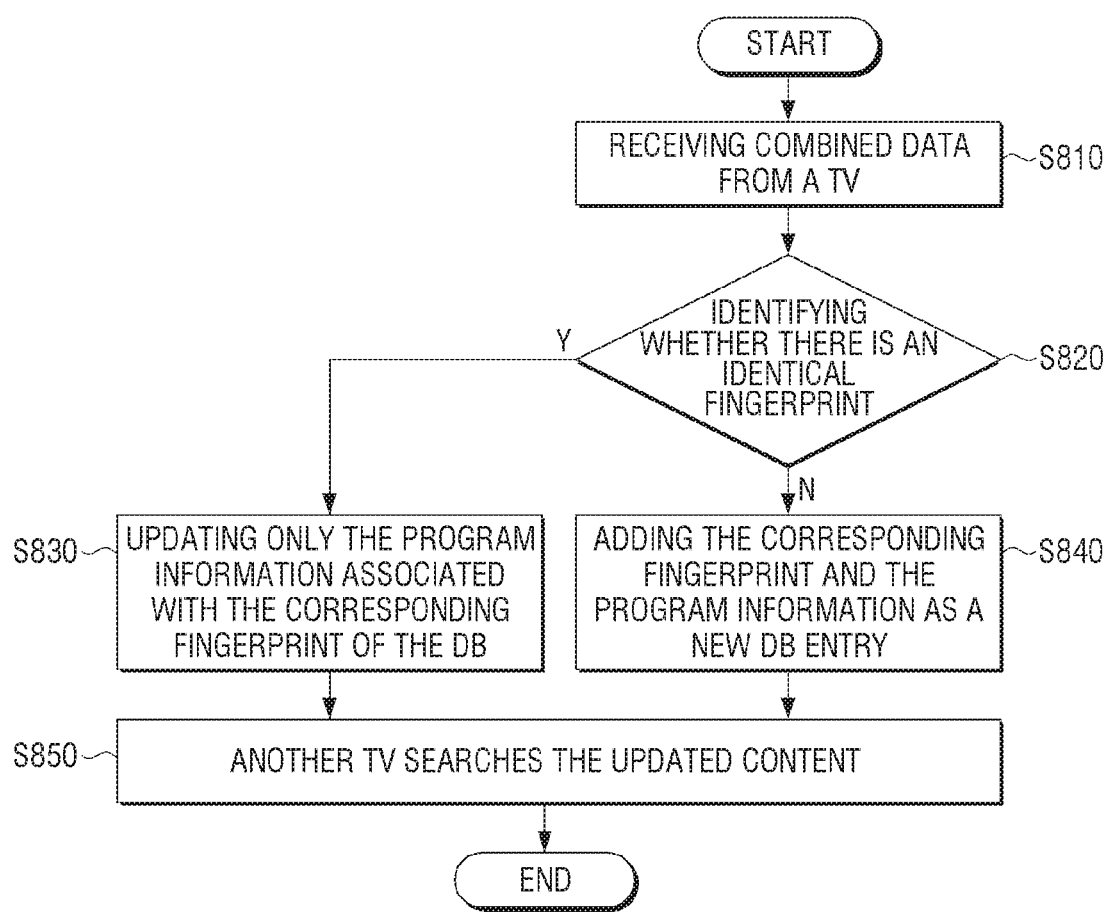
FIG. 8 is a flow chart for illustrating an operation of a server according to an embodiment.

FIG. 8 is a flow chart for illustrating an operation of a server 200 according to an embodiment.

First, the processor 230 of the server 200 may receive combined data from a TV at operation S810. Here, the combined data may include fingerprints and content information. However, the disclosure is not limited thereto, and the processor 230 may receive combined data from an electronic apparatus not including a display.

The processor 230 may identify whether there is a fingerprint identical to the received fingerprint at operation S820. If there is an identical fingerprint at operation S820-Y, the processor 230 may update only program information associated with the corresponding fingerprint in the database at operation S830. Alternatively, in case there is no identical fingerprint at operation S820-N, the processor 230 may add the corresponding fingerprint and the program information as a new database entry at operation S840.

Then, the processor 230 may operate such that another TV can search the updated content at operation S850.

Figure 9:
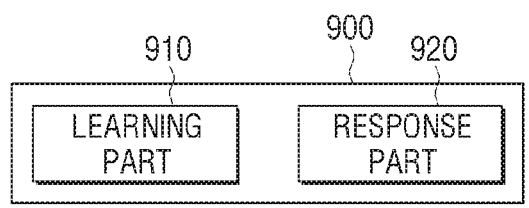
FIG. 9 is a block diagram illustrating a configuration of another electronic apparatus according to an embodiment.

FIG. 9 is a block diagram illustrating a configuration of another electronic apparatus according to an embodiment. Here, another electronic apparatus may be an apparatus acquiring a content information acquisition model through an artificial intelligence algorithm.

Referring to FIG. 9, another electronic apparatus may include at least one of a learning part 910 or a response part 920.

The learning part 910 may generate or train an artificial intelligence model for identifying objects by using learning data. Also, the learning part 910 may generate a determination model having a standard for determination by using the collected learning data.

The response part 920 may use specific data as input data for a trained artificial intelligence model, and thereby acquire objects included in a specific image.

According to an embodiment, the learning part 910 and the response part 920 may be included in another electronic apparatus, but this is merely an example, and they may be installed inside the electronic apparatus 100. Specifically, at least a part of the learning part 910 and at least a part of the response part 920 may be implemented as a software module or manufactured in the form of at least one hardware chip, and installed on the electronic apparatus 100. For example, at least one of the learning part 910 and the response part 920 may be manufactured in the form of a dedicated hardware chip for artificial intelligence (AI), or as a portion of a general purpose processor (e.g., a CPU or an application processor) or a graphic-dedicated processor (e.g., a GPU), and installed on the aforementioned various types of electronic apparatuses. Here, a dedicated hardware chip for artificial intelligence is a dedicated processor specialized in probability operations, and it has higher performance in parallel processing than general purpose processors, and is capable of processing operation works swiftly in the field of artificial intelligence like machine learning. In case the learning part 910 and the response part 920 are implemented as a software module (or, a program module including instructions), the software module may be stored in a non-transitory computer readable medium. In this case, the software module may be provided by an OS, or a specific application. Alternatively, a portion of the software module may be provided by an OS, and the other portions may be provided by a specific application.

In this case, the learning part 910 and the response part 920 may be installed on one electronic apparatus, or installed respectively on separate electronic apparatuses. For example, one of the learning part 910 and the response part 920 may be included in the electronic apparatus 100, and the other one may be included in another electronic apparatus. Also, the learning part 910 and the response part 920 are connected with each other through wire or wirelessly, and the model information constructed by the learning part 910 may be provided to the response part 920, and the data input to the response part 920 may be provided to the learning part 910 as additional learning data.

Figure 10:
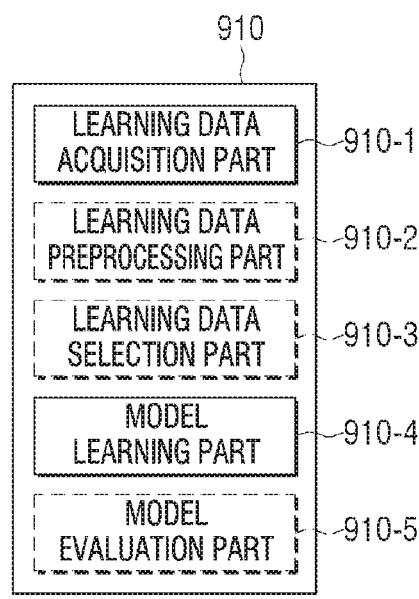
FIG. 10 is a block diagram illustrating a learning part 910 according to an embodiment.

FIG. 10 is a block diagram illustrating a learning part 910 according to an embodiment.

Referring to FIG. 10, the learning part 910 according to some embodiments may include a learning data acquisition part 910-1 and a model learning part 910-4. Also, the learning part 910 may selectively further include at least one of a learning data preprocessing part 910-2, a learning data selection part 910-3 or a model evaluation part 910-5.

The learning data acquisition part 910-1 may acquire learning data necessary for an artificial intelligence model for identifying objects. According to an embodiment, the learning data acquisition part 910-1 may acquire a plurality of sample images and a plurality of objects included in the plurality of sample images as learning data. The learning data may be data collected or tested by the learning part 910 or the manufacturer of the learning part 910.

The model learning part 910-4 may train an artificial intelligence model to have a standard for identifying objects from an image by using learning data. As an example, the model learning part 910-4 may train an artificial intelligence model through supervised learning of at least some portions of learning data. Alternatively, the model learning part 910-4 may, for example, train an artificial intelligence model through unsupervised learning of finding a standard for identifying objects by self-learning by using learning data without any supervision. In addition, the model learning part 910-4 may, for example, train an artificial intelligence model through reinforcement learning using a feedback as to whether a result of providing a response according to learning is correct. Further, the model learning part 910-4 may, for example, train an artificial intelligence model using a learning algorithm or the like including error back-propagation or gradient descent.

Also, the model learning part 910-4 may learn a standard for selection regarding what kind of learning data is to be used for identifying objects by using input data.

In case there are a plurality of artificial intelligence models constructed in advance, the model learning part 910-4 may determine an artificial intelligence model wherein there is big relevance between input learning data and basic learning data as an artificial intelligence model to be trained. In this case, basic learning data may have been classified in advance according to the types of data, and artificial intelligence models may have been constructed in advance according to the types of data.

When an artificial intelligence model is trained, the model learning part 910-4 may store the trained artificial intelligence model. In this case, the model learning part 910-4 may store the trained artificial intelligence model in the memory of another electronic apparatus. Alternatively, the model learning part 910-4 may store the trained artificial intelligence model in a server connected with another electronic apparatus through wire or a wireless network, or a memory of an electronic apparatus.

The learning part 910 may further include a learning data preprocessing part 910-2 and a learning data selection part 910-3, for improving the result of response by an artificial intelligence model or saving resources or time necessary for generating an artificial intelligence model.

The learning data preprocessing part 910-2 may preprocess the acquired data, such that the acquired data can be used for learning for identifying objects from an image. That is, the learning data preprocessing part 910-2 may process the acquired data in a predetermined format. For example, the learning data preprocessing part 910-2 may divide a sample image into a plurality of areas.

The learning data selection part 910-3 may select data necessary for learning among data acquired at the learning data acquisition part 910-1 or data preprocessed at the learning data preprocessing part 910-2. The selected learning data may be provided to the model learning part 910-4. Also, the learning data selection part 910-3 may select learning data necessary for learning among the acquired or preprocessed data, according to a predetermined standard for selection. In addition, the learning data selection part 910-3 may select learning data according to a predetermined standard for selection by learning by the model learning part 910-4.

The learning part 910 may further include a model evaluation part 910-5, for improving the result of response by an artificial intelligence model.

The model evaluation part 910-5 may input evaluation data into an artificial intelligence model, and in case the result of response output from the evaluation data does not satisfy a specific standard, may make the model learning part 910-4 learn again. In this case, the evaluation data may be predefined data for evaluating an artificial intelligence model.

In case there are a plurality of trained artificial intelligence models, the model evaluation part 910-5 may evaluate each of the trained artificial intelligence models whether it satisfies a specific standard, and determine a model satisfying a specific standard as a final artificial intelligence model. In this case, if there are a plurality of models satisfying a specific standard, the model evaluation part 910-5 may determine a model or models in a specific number that were set in advance in the order of having a higher evaluation score as a final artificial intelligence model (final artificial intelligence models).

Figure 11:
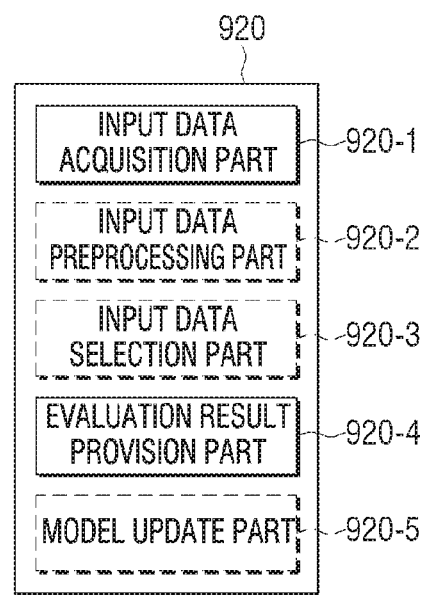
FIG. 11 is a block diagram illustrating a response part 920 according to an embodiment.

FIG. 11 is a block diagram illustrating a response part 920 according to an embodiment.

Referring to FIG. 11, the response part 920 according to some embodiments may include an input data acquisition part 920-1 and a response result provision part 920-4.

Also, the response part 920 may selectively further include at least one of an input data preprocessing pat 920-2, an input data selection part 920-3 or a model update part 920-5.

The input data acquisition part 920-1 may acquire data necessary for identifying objects. The response result provision part 920-4 may apply input data acquired at the input data acquisition part 920-1 to a trained artificial intelligence model as an input value, and identify objects from an image. Also, the response result provision part 920-4 may apply data selected by the input data preprocessing part 920-2 or the input data selection part 920-3 that will be described later to an artificial intelligence model as an input value, and acquire a result of response. The result of response may be determined by an artificial intelligence model.

As an example, the response result provision part 920-4 may identify objects from an image by applying an artificial intelligence model identifying objects acquired at the input data acquisition part 920-1.

The response part 920 may further include an input data preprocessing part 920-2 and an input data selection part 920-3, for improving the result of response by an artificial intelligence model or saving resources or time necessary for providing a result of response.

The input data preprocessing part 920-2 may preprocess the acquired data, such that the acquired data can be used for identifying objects. That is, the input data preprocessing part 920-2 may process the data acquired by the input data acquisition part 920-1 in a predefined format.

The input data selection part 920-3 may select data necessary for providing a response among data acquired at the input data acquisition part 920-1 or data preprocessed at the input data preprocessing part 920-2. The selected data may be provided to the response result provision part 920-4. Also, the input data selection part 920-3 may select some or all among the acquired or preprocessed data, according to a predetermined standard for selection for providing a response. In addition, the input data selection part 920-3 may select data according to a predetermined standard for selection by learning by the model learning part 910-4.

The model update part 920-5 may control an artificial intelligence model to be updated, based on the evaluation for a response result provided by the response result provision part 920-4. For example, the model update part 920-5 may provide a response result provided by the response result provision part 920-4 to the model learning part 910-4, and thereby request the model learning part 910-4 to additionally train or update an artificial intelligence model.

Figure 12:
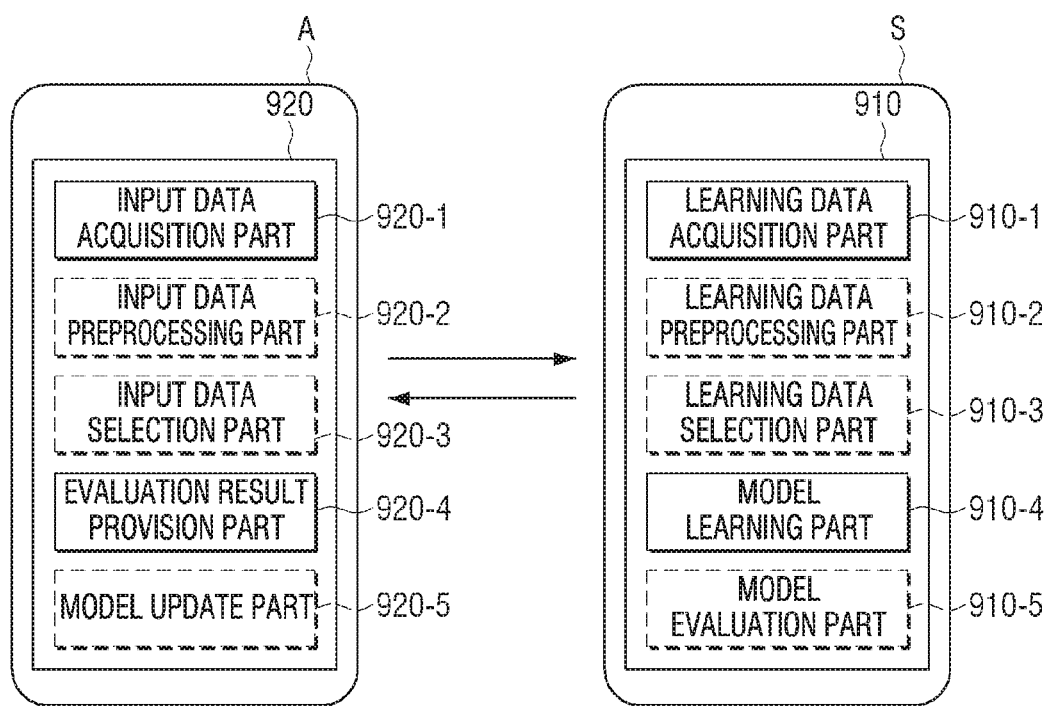
FIG. 12 is a diagram illustrating an example wherein data is learned and determined as an electronic apparatus 100 according to an embodiment and an external server S are in communication with each other.

FIG. 12 is a diagram illustrating an example wherein data is learned and determined as an electronic apparatus 100 according to an embodiment and an external server S are in communication with each other.

Referring to FIG. 12, an external server S may learn a standard for identifying objects from an image. The electronic apparatus A may identify objects from an image based on the result of learning by the server S.

In this case, the model learning part 910-4 of the server S may perform the function of the learning part 910 illustrated in FIG. 10. That is, the model learning part 910-4 of the server S may learn a standard for which image information is to be used for identifying objects, and how objects are to be identified by using the information.

Also, the response result provision part 920-4 of the electronic apparatus A may apply data selected by the input data selection part 920-3 to an artificial intelligence model generated by the server S, and identify objects from an image. Alternatively, the response result provision part 920-4 of the electronic apparatus A may receive an artificial intelligence model generated by the server S from the server S, and identify objects from an image by using the received artificial intelligence model.

Figure 13:
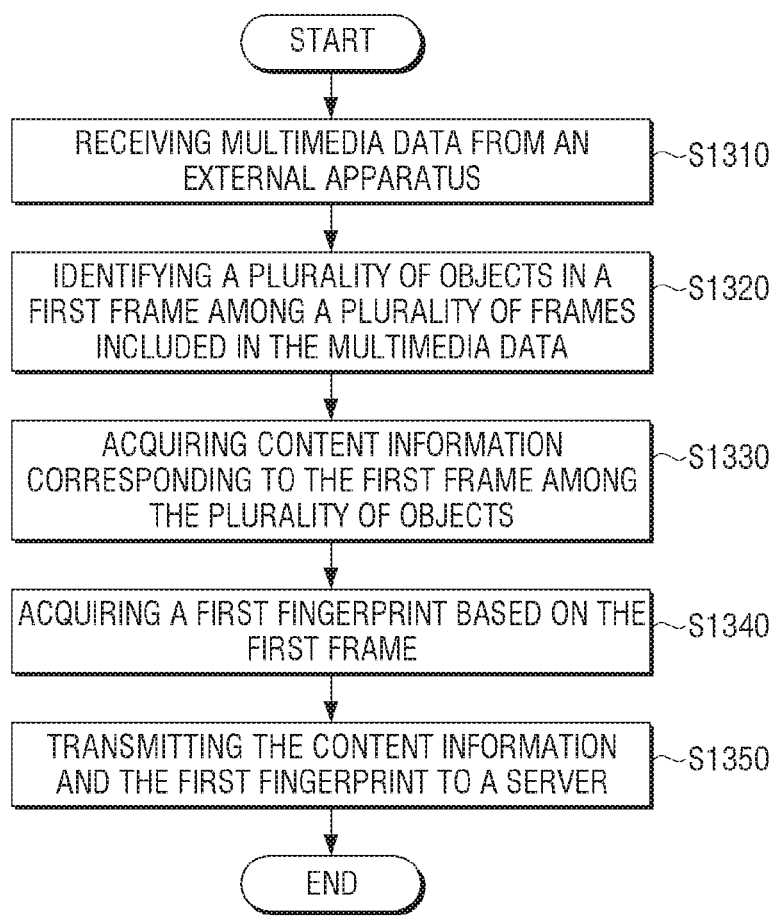
FIG. 13 is a flow chart for illustrating a method of controlling an electronic apparatus according to an embodiment.

FIG. 13 is a flow chart for illustrating a method of controlling an electronic apparatus according to an embodiment.

First, multimedia data is received from an external apparatus at operation S1310. Then, a plurality of objects are identified in a first frame among a plurality of frames included in the multimedia data at operation S1320. Then, content information corresponding to the first frame among the plurality of objects is acquired at operation S1330. Then, a first fingerprint is acquired based on the first frame at operation S1340. Then, the content information and the first fingerprint are transmitted to a server at operation S1350.

Here, the method of controlling an electronic apparatus may further include the steps of, based on the content information not being identified in a frame after the first frame among the plurality of frames, acquiring a second fingerprint based on a second frame wherein the content information was not identified, and transmitting the second fingerprint to a server.

Also, the method of controlling an electronic apparatus may further include the steps of, based on the content information being re-identified in a frame after the second frame among the plurality of frames, acquiring a third fingerprint based on a third frame wherein the content information was re-identified, and transmitting the re-identified content information and the third fingerprint to a server.

In addition, in the transmitting step at operation S1350, the content information, the first fingerprint and a time point of reproduction of the first frame may be transmitted to a server.

In the step of acquiring content information at operation S1330, in case images having pixel values in a predetermined similar range are identified in the same areas of some continuous frames among the plurality of frames, content information may be acquired by applying an optical character reader (OCR) to the images.

According to the various embodiments as above, an electronic apparatus may transmit fingerprints of a content being reproduced and content information to a server, and thereby reduce a burden according to construction of a fingerprint database of a server, and construct a real time fingerprint database.

According to an embodiment, the various embodiments described so far may be implemented as software including instructions stored in machine-readable storage media, which can be read by machines (e.g., computers). The machines refer to apparatuses that load one or more instructions stored in a storage medium, and can operate according to the one or more instructions, and the apparatuses may include an electronic apparatus according to the aforementioned embodiments (e.g., an electronic apparatus A). In case a command corresponding to an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, the method according to the various embodiments described so far may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g.. play store TM). In the case of on-line distribution, at least a portion of a computer program product may be stored in a storage medium such as the server of the manufacturer, the server of the application store and the memory of the relay server at least temporarily, or may be generated temporarily.

In addition, according to an embodiment, the various embodiments may be implemented in a recording medium that can be read by a computer or an apparatus similar to a computer, by using software, hardware, or a combination thereof. In some cases, the embodiments described in this specification may be implemented by a processor itself. According to implementation by software, the embodiments such as processes and functions described in this specification may be implemented by separate software modules. Each of the software modules can perform one or more functions and operations described in this specification.

Computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache and a memory. As specific examples of a non-transitory computer-readable medium, there may be a CD, a DVD, a hard disc, a blue-ray disc, a USB, a memory card, a ROM and the like.

Also, each of the components according to the aforementioned various embodiments (e.g., a module or a program) may consist of a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed in a different order or omitted, or other operations may be added.

While the disclosure has been shown and described with reference to embodiments, the disclosure is not limited to the aforementioned specific embodiments, and modifications can be made without departing from the gist of the disclosure as claimed by the appended claims. Also, it is intended that such modifications are not to be interpreted independently from the technical idea or prospect.

What is claimed is:

1. An electronic apparatus comprising:
a communicator; and
a processor configured to:
  receive multimedia data from an external apparatus through the communicator;
  identify a first plurality of objects in a first frame among a plurality of frames included in the multimedia data, the first plurality of objects comprising first text characters;
  obtain first content information corresponding to the first plurality of objects in the first frame, the first content information comprising first text indicated by the first text characters;
  obtain a first fingerprint based on the first frame;
  control the communicator to transmit the first fingerprint to a server;
  obtain second content information corresponding to a second plurality of objects in a second frame;
  obtain third content information corresponding to a third plurality of objects in a third frame;
  identify whether identical objects are included in each of the first plurality of objects, the second plurality of objects and the third plurality of objects; and
  control the communicator to transmit the third content information to the server based on identifying the identical objects are included in each of the first plurality of objects, the second plurality of objects and the third plurality of objects,
wherein the first frame, the second frame and the third frame are continuous frames of the plurality of frames.

2. The electronic apparatus of claim 1, wherein the plurality of frames comprises a fourth frame after the third frame,
wherein the fourth frame does not include content information, and
wherein the processor is further configured to:
  obtain a fourth fingerprint based on the fourth frame; and
  control the communicator to transmit the fourth fingerprint to the server.

3. The electronic apparatus of claim 1, wherein the processor is further configured to control the communicator to transmit the third content information, a third fingerprint corresponding to the third frame and a third time point of reproduction of the third frame to the server based on identifying the identical objects are included in each of the first plurality of objects, the second plurality of objects and the third plurality of objects.

4. The electronic apparatus of claim 1, wherein the processor is further configured to:

identify a first area of the first frame corresponding to the
   first plurality of objects;
identify a second area of the first frame that is adjacent the
   first area;
obtain a second fingerprint of the second frame based on
   a portion of the second frame that corresponds to the
   second area of the first frame;
obtain a third fingerprint of the third frame based on a
   portion of the third frame that corresponds to the
   second area of the first frame; and
control the communicator to transmit the second fingerprint and the third fingerprint to the server.

5. The electronic apparatus of claim 1, further comprising a storage,
   wherein the processor is further configured to identify the first plurality of objects in the first frame based on a content information acquisition model stored in the storage, and
   wherein the content information acquisition model is acquired by training based on a plurality of sample images and a plurality of pieces of content information included in the plurality of sample images through an artificial intelligence algorithm.

6. The electronic apparatus of claim 1, further comprising a display,
   wherein the processor is further configured to:
      control the display to sequentially display the plurality of frames; and
      sequentially obtain a corresponding fingerprint for a displayed frame among the plurality of frames.

7. The electronic apparatus of claim 1, wherein the third content information comprises a title of a content corresponding to the first frame, a reproduction time of the content and channel information of the content.

8. An electronic system comprising:
   a server; and
   an electronic apparatus configured to:
      identify a first plurality of objects in a first frame among a plurality of frames included multimedia data received from an external apparatus, the first plurality of objects comprising first text characters;
      obtain first content information corresponding to the first plurality of objects in the first frame, the first content information comprising first text indicated by the first text characters;
      obtain a first fingerprint based on the first frame;
      transmit the first fingerprint to the server;
      obtain a second fingerprint based on a second frame;
      obtain second content information corresponding to a second plurality of objects in the second frame;
      obtain a third fingerprint based on a third frame;
      obtain third content information corresponding to a third plurality of objects in the third frame;
      identify whether identical objects are included in each of the first plurality of objects, the second plurality of objects and the third plurality of objects; and
      transmit the third content information to the server based on identifying the identical objects are included in each of the first plurality of objects, the second plurality of objects and the third plurality of objects,
   wherein the server is configured to:
      receive the third content information and the third fingerprint from the electronic apparatus; and
      map the third fingerprint with a content corresponding to the third content information among a plurality of pre-stored contents and store the third fingerprint.

9. The electronic system of claim 8, wherein the plurality of frames comprises a fourth frame after the third frame,
   wherein the fourth frame does not include content information,
   wherein the electronic apparatus is further configured to:
      obtain a fourth fingerprint corresponding to the fourth frame; and
      transmit the fourth fingerprint to the server, and
   wherein the server is further configured to:
      receive the fourth fingerprint from the electronic apparatus; and
      map the fourth fingerprint with the content corresponding to the third content information and store the fourth fingerprint.

10. The electronic system of claim 8, further comprising another electronic apparatus configured to reproduce the content,
   wherein the server is configured to, based on fingerprints from the electronic apparatus not being received, transmit a request for fingerprints of frames for which fingerprints were not received to the another electronic apparatus.

11. The electronic system of claim 9, wherein the server is further configured to, based on the third fingerprint received from the electronic apparatus being pre-stored, transmit a request for stopping transmission of fingerprints for the content to the electronic apparatus, and
   wherein the electronic apparatus is further configured to, based on receiving the request for stopping transmission, stop obtaining fingerprints.

12. The electronic system of claim 8, wherein the server is further configured to:
   identify an incomplete content for which fingerprints for all frames are not stored among the plurality of pre-stored contents; and
   transmit a request for fingerprints for the incomplete content to the electronic apparatus.

13. A method of controlling an electronic apparatus comprising:
   receiving multimedia data from an external apparatus;
   identifying a first plurality of objects in a first frame among a plurality of frames included in the multimedia data, the first plurality of objects comprising first text characters;
   obtaining first content information corresponding to the first plurality of objects in the first frame, the first content information comprising first text indicated by the first text characters;
   obtaining a first fingerprint based on the first frame;
   transmitting the first fingerprint to a server;
   obtaining second content information corresponding to a second plurality of objects in a second frame;
   obtaining third content information corresponding to a third plurality of objects in a third frame;
   identifying that identical objects are included in each of the first plurality of objects, the second plurality of objects and the third plurality of objects; and
   transmitting the third content information to the server based on the identical objects being included in each of the first plurality of objects, the second plurality of objects and the third plurality of objects,
   wherein the first frame, the second frame and the third frame are continuous frames of the plurality of frames.

14. The method of controlling an electronic apparatus of claim 13, wherein the plurality of frames comprises a fourth frame after the third frame, wherein the second fourth frame does not include the content information, and wherein the method further comprises:

obtaining a fourth fingerprint based on the fourth frame; and transmitting the fourth fingerprint to the server.

15. The method of controlling an electronic apparatus of claim 14, wherein the transmitting comprises transmitting the third content information, a third fingerprint corresponding to the third frame and a third time point of reproduction of the third frame to the server based on the identical objects being included in each of the first plurality of objects, the second plurality of objects and the third plurality of objects.

* * * * *